(12) United States Patent
Wiryawan et al.

(10) Patent No.: US 7,720,730 B2
(45) Date of Patent: May 18, 2010

(54) METHOD AND APPARATUS FOR CAPTURING CONSUMER LOAN APPLICATION DATA

(75) Inventors: Antonius Adhi Wiryawan, Hayward, CA (US); Re Lai, Belmont, CA (US); Weide Ju, Cupertino, CA (US); Hichem Sellami, Oakland, CA (US); Durgesh Kotwal, Fremont, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1497 days.

(21) Appl. No.: 10/025,523

(22) Filed: Dec. 18, 2001

(65) Prior Publication Data

US 2007/0244805 A1    Oct. 18, 2007

(51) Int. Cl.
*G06Q 40/00* (2006.01)

(52) U.S. Cl. .......................................................... 705/35

(58) Field of Classification Search .................. 705/35, 705/38; 707/1–6, 100–104, 200; 715/234, 715/239, 243, 253, 700
See application file for complete search history.

(56) References Cited

U.S. PATENT DOCUMENTS

| | | | |
|---|---|---|---|
| 5,699,527 A | 12/1997 | Davidson .................... 395/238 |
| 6,014,670 A | 1/2000 | Zamanian et al. ........... 101/101 |
| 6,301,586 B1 * | 10/2001 | Yang et al. ............... 707/104.1 |
| 6,345,278 B1 * | 2/2002 | Hitchcock et al. ........... 707/100 |
| 6,460,042 B1 * | 10/2002 | Hitchcock et al. ............. 707/10 |
| 6,496,835 B2 | 12/2002 | Liu et al. ..................... 707/102 |
| 6,684,196 B1 | 1/2004 | Mini et al. .................... 705/26 |
| 6,694,338 B1 | 2/2004 | Lindsay ....................... 707/203 |
| 6,711,575 B1 | 3/2004 | Applewhite et al. ......... 707/100 |
| 6,823,495 B1 | 11/2004 | Vedula et al. ............... 715/805 |
| 6,889,260 B1 | 5/2005 | Hughes ....................... 709/246 |
| 7,035,820 B2 | 4/2006 | Goodwin et al. .............. 705/37 |
| 7,257,581 B1 | 8/2007 | Steele et al. .................. 707/10 |
| 7,284,005 B1 | 10/2007 | Wiryawan et al. ........... 707/101 |
| 2002/0059137 A1 | 5/2002 | Freeman et al. ............... 705/38 |
| 2002/0062277 A1 * | 5/2002 | Foster et al. .................. 705/38 |
| 2002/0091732 A1 | 7/2002 | Pedro ......................... 707/505 |
| 2003/0004965 A1 | 1/2003 | Farmer et al. ............ 707/104.1 |
| 2003/0112306 A1 * | 6/2003 | Simpson et al. ............. 347/101 |

OTHER PUBLICATIONS

Britt, "NationsBank pilots on-line auto loan application system", America's Community Banker, v5n6, pp. 9, Jun. 1996.*

(Continued)

*Primary Examiner*—Mary Cheung
(74) *Attorney, Agent, or Firm*—Campbell Stephenson LLP

(57) ABSTRACT

Methods, apparatus, and articles of manufacture for capturing consumer loan application data are disclosed herein. Embodiments of the invention provide mechanisms for capturing consumer loan application data corresponding to a plurality of consumer loan application types within a single software application, and for the navigation of a user through a series of linked user interface displays to facilitate the capture of relevant information. In addition, the network environment of methodologies in accordance with the teachings of the present invention provides for the storage of data in a relational database management system that enables previously entered data to pre-populate data fields of subsequent user interface displays and/or subsequent consumer loan applications without the necessity to re-enter the data.

24 Claims, 20 Drawing Sheets

OTHER PUBLICATIONS

Antonius Adhi Wiryawan et al., "Method and Apparatus for Capturing Commercial Loan Application Data and Assigning a Commercial Loan Request," United States U.S. Appl. No. 10/024,990, filed Dec. 19, 2001.

Antonius Adhi Wiryawan et al., "Data Transfer Method and System," U.S. Appl. No. 10/025,126, filed Dec. 18, 2001.

* cited by examiner

FINANCIAL SERVICES

TYPE YOUR NAME AND PASSWORD TO LOG IN.

USER NAME:

PASSWORD:

CONNECT TO: ~1005

OK ~1001    CANCEL ~1003

*FIG. 10*

CUSTOMER ~1101

NEW ~1105    QUERY ~1103    ~1102    1111

| LAST NAME: | SSN: | WORK PH.: | DON'T CALL: ○ |
| MIDDLE INIT.: | M.MDN. NAME: | HOME PH.: | DON'T MAIL: ○ |
| FIRST NAME: | DOB: | WORK FX.: | DON'T SHARE: ○ |
| MR/MRS: | SUFFIX: | EMAIL: | TEAM: |
| HOUSEHOLD: | STATUS: | JOB TITLE: | COMPANY: |

APPLICATIONS ~1107

NAME ♦  STAGE ♦  DATE ♦

ACCOUNTS ~1109

ACNT # ♦  PRODUCT ♦  BALANCE ♦

| APPLICATION | ~1201 | | 1217 | 1215 |
|---|---|---|---|---|
| | | | PREVIOUS | NEXT |

APLN. NAME:     APLN. ID:     PROD. NAME:

OWNSHP. TYPE:     STAGE:     PROD. AMT.:

◄ APLCNT / CON. DTL. / BUS. DTL / PRD. DTL / RL. EST. / VEHICLE / COLLATL. ►

SHOW: [INCOME SOURCES ▼]    (LIST)    1405

INCOME SOURCES — 1401   1303    1403     1203

| APPLICANT: | RESP'SIBILITY: | AMOUNT: | START DATE: |
|---|---|---|---|
| EMPLOYER | OCCUPATION: | FREQUENCY: | END DATE: |
| EMP. STATUS: | TYPE: | TAXABLE: | YRS. EMP'D: |
| BUS. TYPE: | INCOME TYPE: | # JOBS/5YR.: | YRS. IN PROF.: |

FIG. 15

| APPLICATION | ~1201 | | 1217 | 1215 |
|---|---|---|---|---|
| | | | PREVIOUS | NEXT |

APLN. NAME:     APLN. ID:     PROD. NAME:

OWNSHP. TYPE:     STAGE:     PROD. AMT.:

◄ APLCNT / CON. DTL. / BUS. DTL / PRD. DTL / RL. EST. / VEHICLE / COLLATL. ►

SHOW: [FINANCIAL POS'N ▼]    (LIST)    1505

FINANCIAL POS'N — 1501   1303    1503     1203

| AUTOMOBILES: | REAL ESTATE: | OTHER: | LIABILITIES: |
|---|---|---|---|
| | | | |

FIG. 16

APPLICATION — 1201
PREVIOUS  NEXT — 1217, 1215

APLN. NAME:   APLN. ID:   PROD. NAME:
OWNSHP. TYPE:   STAGE:   PROD. AMT.:

APLCNT / CON. DTL / BUS. DTL / PRD. DTL / RL. EST. / VEHICLE / COLLATL.
SHOW: PROPERTY DETAIL    (LIST) 1605    — 1203

PROPERTY DETAIL — 1601, 1607, 1603

| CATEGORY: | ZIP CODE: | PROP. TYPE: | SQ. FEET: |
| PRP. ADDRESS: | COUNTY: | YR. BUILT: | LOT LENGTH: |
| CITY: | OWNERS: | YR. PURCH.: | LOT WIDTH: |
| STATE: | % OWNED: | DESCRIPT'N: | FLOOD ZONE: |

FIG. 17

APPLICATION — 1201
PREVIOUS  NEXT — 1217, 1215

APLN. NAME:   APLN. ID:   PROD. NAME:
OWNSHP. TYPE:   STAGE:   PROD. AMT.:

APLCNT / CON. DTL / BUS. DTL / PRD. DTL / RL. EST. / VEHICLE / COLLATL.
SHOW: COLLATERAL DTL.    (LIST) 1705

COLLAT'L DETAIL — 1701, 1707, 1703, 1203

| CATEGORY | OWNERS: | PRICE DATE: | COMPANY: |
| REFERENCE #: | IN NAME OF: | MAT'Y DATE: | POLICY #: |
| # OF GOODS: | MRKT. VALUE: | LENDABLE %: | DEDUCTIBLES: |
| DESCRIPT'N: | BASIS: | COVR'G. TYPE: | EXP. DATE: |

FIG. 18

APPLICATION  1201
PREVIOUS  NEXT  1217 1215

APLN. NAME:  APLN. ID:  PROD. NAME:
OWNSHP. TYPE:  STAGE:  PROD. AMT.:

APLCNT / CON. DTL / BUS. DTL / PRD. DTL / RL. EST. / VEHICLE / COLLATL.  1203
SHOW: AUTOCHECK SEL.  (LIST) 1805

AUTOCHECK SEL.  1801 1807  1803
PURCH'S/TR'D:  VIN:  STYLE:  OPTIONS:
NW./USD./DEM.:  VIN ERROR:  MILEAGE:  OPT'S TOTAL:
YEAR:  MAKE:  VAL'N. SYSTEM:  ADJUSTM'TS:
REGION:  MODEL:  VAL'N. DATE:  ADJ'TS. TOTAL:

FIG. 19

APPLICATION  1201
PREVIOUS  NEXT  1217 1215

APLN. NAME:  APLN. ID:  PROD. NAME:
OWNSHP. TYPE:  STAGE:  PROD. AMT.:

APLCNT / CON. DTL / BUS. DTL / PRD. DTL / RL. EST. / VEHICLE / COLLATL.  1203
SHOW: VEHICLE DETAIL  (LIST) 1905

VEHICLE DETAIL  1901 1807  1903
PURC./TRADE:  MAKE:  # CYLINDERS:  OPTIONS:
NW./USD./DEM.:  MODEL:  BODY TYPE:  RETAIL AMT.:
YEAR:  STYLE:  ENGINE SIZE:  WSLE. AMT.:
VIN:  MILEAGE:  DESCRIPT'N:  RESIDU'L AMT.:

FIG. 20

```
APPLICATION    1201                           1217    1215
                                              PREVIOUS  NEXT
APLN. NAME:        APLN. ID:        PROD. NAME:
[          ]       [          ]     [          ]
OWNSHP. TYPE:      STAGE:           PROD. AMT.:
[        ▼]        [        ▼]      [          ]

◄ APLCNT / CON. DTL / BUS. DTL / PRD. DTL / RL. EST / VEHICLE / COLLATL ►
SHOW: [VEH. FINANCIALS ▼]  (LIST)  2005
                                                              1203
VEH. FINANCIALS    2001  1807              2003
CASH PRICE:    UNP'D BAL.:    PAYMENT         TRADE
[        ]     [        ]     [        ]     [        ]
DOWN. PMT.:    FIN'D. INSUR.: REBATE AMT.:   TRADE AMT.:
[        ]     [        ]     [        ]     [        ]
DOWN PMT. %:   FIN'D FEES:    $ DWN. AMT.:   OW'G ON TR'D.:
[        ]     [        ]     [        ]     [        ]
RETAIL AMT.:   TOTAL FIN'D:   LOAN TO VAL.:  NET TRADE $:
[        ]     [        ]     [        ]     [        ]
```

FIG. 21

```
APPLICATION    1201                           1217    2109
                                              PREVIOUS  SUBMIT
APLN. NAME:        APLN. ID:        PROD. NAME:
[          ]       [          ]     [          ]
OWNSHP. TYPE:      STAGE:           PROD. AMT.:
[        ▼]        [        ▼]      [          ]

◄ APLCNT / CON. DTL / BUS. DTL / PRD. DTL / RL. EST / VEHICLE / COLLATL ►
SHOW: [REQUESTED LOAN ▼]  (LIST)  2105
                                                              1203
REQUESTED LOAN    2101  2107              2103
PRODUCT:       SECURITY:      LOAN COND'N:   VARIANCE:
[       ▼]     [        ]     [        ]     [        ]
AMOUNT:        PMT. METH.:    RATE:          TX. RT.-LEASE:
[        ]     [        ]     [        ]     [        ]
PAYMENT:       CRED. INS.:    BASE:          TERM:
[        ]     [        ]     [        ]     [        ]
PMT. FREQ.:    LOAN EXCP'N:   CUR'NT RATE:   AMORTIZAT'N:
[        ]     [        ]     [        ]     [        ]
```

FIG. 22

APPLICATION — 1201 — 1217 — 1215
PREVIOUS  NEXT

APLN. NAME:  APLN. ID:  PROD. NAME:
OWNSHP. TYPE:  STAGE:  PROD. AMT.:

APLCNT / CON. DTL / BUS. DTL / PRD. DTL / RL. EST. / VEHICLE / COLLATL

SHOW: LEASE SELECTION   (LIST)   2205

LEASE SELECTION — 2201  1807   — 2203   1203

| NW./USD./DEM.: | MODEL: | MO. MLG. AL'W.: | VAL'N DATE: |
| YEAR: | STYLE: | EXS. MLG. CRG.: | OPT'S TOTAL: |
| TERM (MO'S): | OPT'S ADJ. %: | LOW MLG. ADJ.: | ADJUSTMENT: |
| MAKE: | BEG. MLG. ADJ.: | VAL'N SYSTEM: | ADJST'S TOTAL: |

FIG. 23

APPLICATION — 1201 — 1217 — 1215
PREVIOUS  NEXT

APLN. NAME:  APLN. ID:  PROD. NAME:
OWNSHP. TYPE:  STAGE:  PROD. AMT.:

APLCNT / CON. DTL / BUS. DTL / PRD. DTL / RL. EST. / VEHICLE / COLLATL

SHOW: PROP. FINANCIALS   (LIST)   2305

PROP. FINANCIALS — 2301  1607  — 2303   1203

| CATEGORY: | BAL. - MRTG.: | EQUITY VALUE: | TAX CRNT.: |
| OWNERS: | NET RENTAL: | TAX VALUE: | PURCHASE $: |
| APRS'D VALUE: | IMPROVM'TS: | MRTG. PMT.: | CRED. NAME: |
| VALUE BASIS: | BOOK VALUE: | EST. AN'L TAX: | ACCT. #: |

FIG. 24

| APPLICATION | 1201 | | 1217 1215 |
|---|---|---|---|
| | | | PREVIOUS NEXT |

APLN. NAME:     APLN. ID:     PROD. NAME:
OWNSHP. TYPE:   STAGE:        PROD. AMT.:

APLCNT / CON. DTL / BUS. DTL / PRD. DTL / RL. EST. / VEHICLE / COLLATL

SHOW: LIEN & INSURANCE   (LIST)   2405

LIEN & INSURANCE  2401 1607        2403      1203

| RC. LIEN DATE: | BLOCK #: | TITLE COMP.: | INS. AGENT: |
| LOT NUMBER: | LIEN HOLDER: | TITLE AGENT: | INS. AMOUNT: |
| BOOK #: | LIEN AMOUNT: | POLICY #: | CVR'G TYPE: |
| PAGE #: | OPEN ENDED ?: | INS. COMPANY: | EXP. DATE: |

FIG. 25

| APPLICATION | 1201 | | 1217 1215 |
|---|---|---|---|
| | | | PREVIOUS NEXT |

APLN. NAME:     APLN. ID:     PROD. NAME:
OWNSHP. TYPE:   STAGE:        PROD. AMT.:

APLCNT / CON. DTL / BUS. DTL / PRD. DTL / RL. EST. / VEHICLE / COLLATL

SHOW: REGULATION C   (LIST)   2505

REGULATION C  2501  2107      2503      1203

| HMDA REQ'D ?: | LOAN AMT.: | ACT'N ON L'N: | REASON 1: |
| LOAN TYPE: | L'N TO VAL.: | ACTION DATE: | REASON 2: |
| LOAN PURP'SE: | PCH'R OF LOAN: | | REASON 3: |
| APR'D VALUE: | OCC'PY TYPE: | PCH. PRICE: | |

FIG. 26

APPLICATION — 1201 — PREVIOUS (1217) NEXT (1215)

APLN. NAME: | APLN. ID: | PROD. NAME:
OWNSHP. TYPE: | STAGE: | PROD. AMT.:

APLCNT / CON. DTL. / BUS. DTL. / PRD. DTL. / RL. EST. / VEHICLE / COLLATL.

SHOW: CREDIT INFO. (LIST) 2605

CREDIT INFO. — 2601, 1303, 2603, 1203

| APPLICANT | EDUC. INST.: | NEAREST REL.: | CITY: |
| DOB: | AN'L INCOME: | RELATIONSHIP: | STATE: |
| MARITAL STAT.: | TAX BRACKET: | HOME PHONE: | ZIP CODE: |
| EDUCATION: | CRD'T SCORE: | ADDRESS: | WORK PHONE: |

FIG. 27

APPLICATION — 1201 — PREVIOUS (1217) SUBMIT (2109)

APLN. NAME: | APLN. ID: | PROD. NAME:
OWNSHP. TYPE: | STAGE: | PROD. AMT.:

APLCNT / CON. DTL. / BUS. DTL. / PRD. DTL. / RL. EST. / VEHICLE / COLLATL.

SHOW: CREDIT CARD DTL. (LIST) 2705

CREDIT CARD DTL. — 2701, 2107, 2703, 1203

| MR./MRS.: | SUFFIX: | STATE: | CARD #: |
| LAST NAME: | SSN: | ZIP CODE: | EXP. DATE: |
| FIRST NAME: | ADDRESS: | COUNTRY: | # OF CARDS: |
| MIDDLE INT.: | CITY: | CARD TYPE: | CREDIT LIMIT: |

APPLICATION  1201  1217  1215
PREVIOUS  NEXT

APLN. NAME:   APLN. ID:   PROD. NAME:

OWNSHP. TYPE:   STAGE:   PROD. AMT.:

APLCNT / CON. DTL / BUS. DTL / PRD. DTL / RL. EST / VEHICLE / COLLATL.

SHOW: LIABILITIES INFO.   (LIST)  3005

LIABILITIES INFO.  3001  2807   3003   1203

| PERIOD END.: | CURRENT LTD: | NON CRN DBT.: | PAID-IN CPT'L: |
| FREQUENCY: | CRN'T LIABLT.: | TOTAL LIABLTS: | RET'D EARN'S: |
| ACCT'S PAYBL.: | TOT. CRN LIAB.: | BASIS: | TL. NET WRTH.: |
| BSL LIABILITY: | LTD: | CPT'L STOCK: | TL. LIAB. & NW.: |

FIG. 31

APPLICATION  1201  1217  1215
PREVIOUS  NEXT

APLN. NAME:   APLN. ID:   PROD. NAME:

OWNSHP. TYPE:   STAGE:   PROD. AMT.:

APLCNT / CON. DTL / BUS. DTL / PRD. DTL / RL. EST / VEHICLE / COLLATL.

SHOW: INCOME STATMNT.   (LIST)  3105

INCOME STATMNT.  3101  2807   3103   1203

| PERIOD END.: | GOODS SOLD: | TL. OP'G INCM.: | TAXES: |
| FREQUENCY: | GROSS PRFT.: | INTEREST: | NET PROFIT: |
| BASIS: | OTH'R INCOME: | OTHER: | DIV./ADJUST: |
| NET SALES: | OTH'R EXPNS.: | DEPRECIAT'N: | RET'D EARN'GS: |

| APPLICATION | 1201 | | 1217 1215 |
|---|---|---|---|
| | | | PREVIOUS NEXT |

| APLN. NAME: | APLN. ID: | PROD. NAME: |
|---|---|---|
| OWNSHP. TYPE: | STAGE: | PROD. AMT.: |

◄ APLCNT. / CON. DTL. / BUS. DTL. / PRD. DTL. / RL. EST. / VEHICLE / COLLATL. ►

SHOW: CASH FLOW ▼ (LIST) 3205

CASH FLOW — 3201  2807                3203              1203

| PERIOD END.: | INTEREST: | DEPR'N EXPN.: | EST. CRN. PAY.: |
|---|---|---|---|
| FREQUENCY: | ACCT'S RECV.: | TL. CASH FLOW: | CRN. PRT. LTD: |
| BASIS: | ADD'L INCOME: | | INTEREST |
| NET PROFIT: | ACC'T PAYBL.: | DEBT SERVC.: | TL. DEBT SERV.: |

*FIG. 32*

METHOD AND APPARATUS FOR CAPTURING CONSUMER LOAN APPLICATION DATA

TECHNICAL FIELD OF THE INVENTION

This disclosure relates generally to financial services, and more particularly, but not exclusively, to methods, apparatus, and articles of manufacture for capturing consumer loan application data via an electronic user interface provided via a network communication link.

BACKGROUND INFORMATION

Many financial and/or lending institutions utilize multiple systems to collect customer information for different types of consumer loan applications. In the most basic scenario, printed-paper forms, with spaces provided for the entry of typed or hand-written customer information, are used to collect any requisite information to facilitate processing of the application and consideration for approval. Different types of loans may typically require different types of information for consideration during processing. As a consequence, different forms may be used by the financial and/or lending institution for each available product (e.g., home equity loan, personal loan, auto loan, and so on).

Because at least a portion of the requisite information may be identical for each loan application (e.g., customer identifying information and/or customer financial information), a loan officer or other representative of the financial institution may be required to repeatedly enter this information into the different forms (or into the same form if the customer returns at a future time for the same product), thereby reducing productivity, and introducing additional potential for errors. Often, the information included in the forms is subsequently entered into a computer system for manipulation or storage, thereby further increasing the likelihood of data integrity errors.

Similarly, the same "forms" may be available in an electronic format accessible by the loan officer or other representative, for example, via a computer. While the potential for data entry errors may be reduced by eliminating the transfer of information from the paper-based form to the computer system, no adequate mechanism exists for populating data fields of electronic loan applications or additional electronic loan applications with previously entered customer information. As a consequence, even though the customer may have previously provided much or all of the requisite information for a consumer loan application (and the information may have been entered by a loan officer or the like for electronic storage), the information is functionally inaccessible for the purpose of completing the consumer loan application, and must be re-entered by the loan officer or other representative.

For example, a customer may open an account (e.g., a checking account) with a local branch of the financial institution and provide a variety of customer identifying information. If the customer returns two weeks later to apply for a credit card, for example, from the financial institution, the same customer identifying information will typically be required, along with additional financial information, for example, and will need to be input again for the credit card application to be processed. Similarly, if the customer is interested in another product in addition to the credit card, a separate loan application, including the same customer information and/or financial information, may require the information to be input yet again. In addition, the loan officer or other representative may have to access a series of appropriate electronic forms to facilitate the entry of information required to process the applications, thereby contributing to a decrease in productivity and an increase in the potential for errors that may delay processing of the applications and result in customer dissatisfaction.

BRIEF DESCRIPTION OF THE VARIOUS VIEWS OF THE DRAWINGS

In the drawings, like reference numerals refer to like parts throughout the various views of the non-limiting and non-exhaustive embodiments of the present invention, and wherein:

FIGS. 10-32 are illustrations of example UI displays for capturing consumer loan application data in accordance with the teachings of the present invention.

DETAILED DESCRIPTION OF THE ILLUSTRATED EMBODIMENTS

Figure 1:
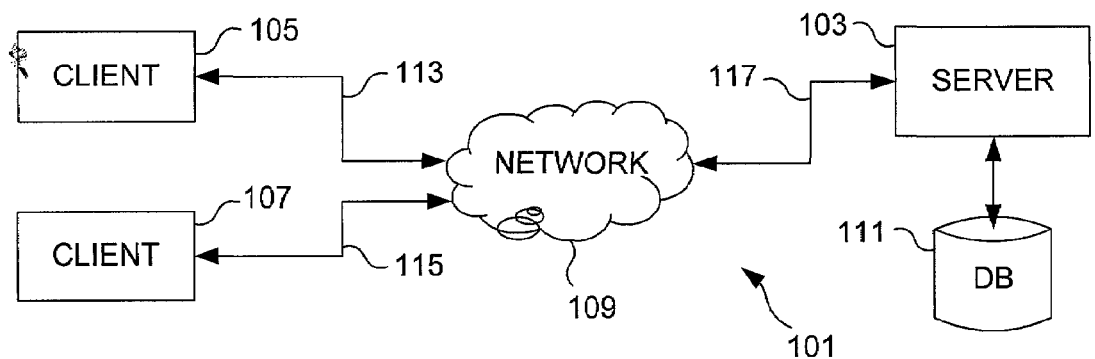
FIG. 1 is a block diagram illustration of a network environment in accordance with the teachings of the present invention.

Embodiments of methods, apparatus, and articles of manufacture for capturing consumer loan application data are described in detail herein. In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, embodiments of the invention provide methods, apparatus, and articles of manufacture for capturing consumer loan application data to enable the data to be utilized for population of data fields in subsequent UI displays and/or loan applications. Furthermore, multiple consumer loan application types may be provided via a single UI, in an embodiment, to facilitate creation of application records with previously provided information, and to navigate a loan officer or other representative through a sequence of UI displays to ensure capture of all relevant consumer loan application data for a variety of available products.

In one representative example in accordance with the teachings of the present invention, a customer may come to a bank or other financial institution seeking a consumer loan of some type. For example, assume the customer is interested in applying for an automobile loan to purchase a new car. At the bank, the customer may be assisted by a loan officer, or other representative, to prepare the loan application. In order for a review committee, or the like, to process and consider the loan application, the loan officer may ask the customer to provide information regarding the customer's identity, including name, address, social-security number, and the like, as well as financial information related to the customer's income sources or other financial positions, and so forth. In addition, information regarding the customer's assets and/or other collateral, as well as information related to the new car may be required. In one embodiment, all of this information (consumer loan application data) may be input into data fields provided via a linked sequence of UI displays specific to an automobile loan application. The information may then be communicated to a server, in an embodiment, for storage in a coupled relational database, or the like.

In one embodiment, the sequence of UI displays may be communicated from a server to a computer used by the loan officer as a series of hypertext markup language ("HTML") documents capable of being processed and displayed by a browser application executed by the computer. If the customer is then subsequently interested in applying for another or different consumer loan, the previously provided information related to the customer's identity and/or financial position may be retrieved from the relational database, and used to pre-populate corresponding data entry fields in the subsequent consumer loan application, thereby allowing the loan officer to forego reentry of this information. In another related scenario, previously provided information may be used to pre-populate data fields of one or more UI displays corresponding to a single consumer loan application. Other features of the illustrated embodiments will be apparent to the reader from the foregoing and the appended claims, and as the detailed description and discussion is read in conjunction with the accompanying drawings.

With reference now to the drawings, and in particular to FIG. 1, an embodiment of a network environment 101 is illustrated in accordance with the teachings of the present invention. In one embodiment, a server 103 may be communicatively coupled to a plurality of client systems 105 and 107 via a network 109. The client systems 105 and 107 may be capable of connecting to the network 109 via individual communication links 113 and 115, respectively, while the server 103 may be capable of connecting to the network 109 via a communication link 117, in an embodiment. It will be appreciated that the number of communicatively coupled client systems may vary in other embodiments in accordance with the teachings of the present invention.

In one embodiment, the communication links 113, 115, and 117 may be used by the client systems 105 and 107, and the server 103, respectively, to send and/or receive content and/or data from one another, such as for example, but not limited to, instructions to cause generation of a user interface display, consumer loan application data, or other data or information. The communication links 113, 115, and 117 may comprise physical connections, such as for example, cables, wires, optical fibers, or the like, in an embodiment. In another embodiment, the communication links 113, 115, and 117 may comprise wireless links, such as for example, radio frequency ("RF") links, satellite transmissions, optical signals, or the like, transmitted through the atmosphere, or any combination of the foregoing. The network 109 may, in various embodiments, be any type of communications network through which a plurality of different devices may communicate, such as for example, but not limited to, the Internet, a wide area network ("WAN"), a local area network ("LAN"), an intranet, or the like, or any combination of networks interconnected with one another.

The server 103 may be coupled to a central storage, such as a database 111, in an embodiment, to store data such as consumer loan application data, or the like. In one embodiment, the database 111 may also store content, such as HTML documents or the like, capable of being communicated to the client systems 105 and 107 via the server 103 in response to a request communicated by one or more of the client systems 105 and 107. It will be appreciated that communication between the server 103 and the client systems 105 and 107 may be facilitated by any one, or a combination of, known protocols, such as for example, but not limited to, hypertext transfer protocol ("HTTP"), transmission control protocol/Internet protocol ("TCP/IP"), or the like. In one embodiment, the database 111 may comprise a relational database configured to store the consumer loan application data in a manner to make data corresponding to a particular customer accessible to a user via reference to a customer name or other unique identifier.

Figure 2:
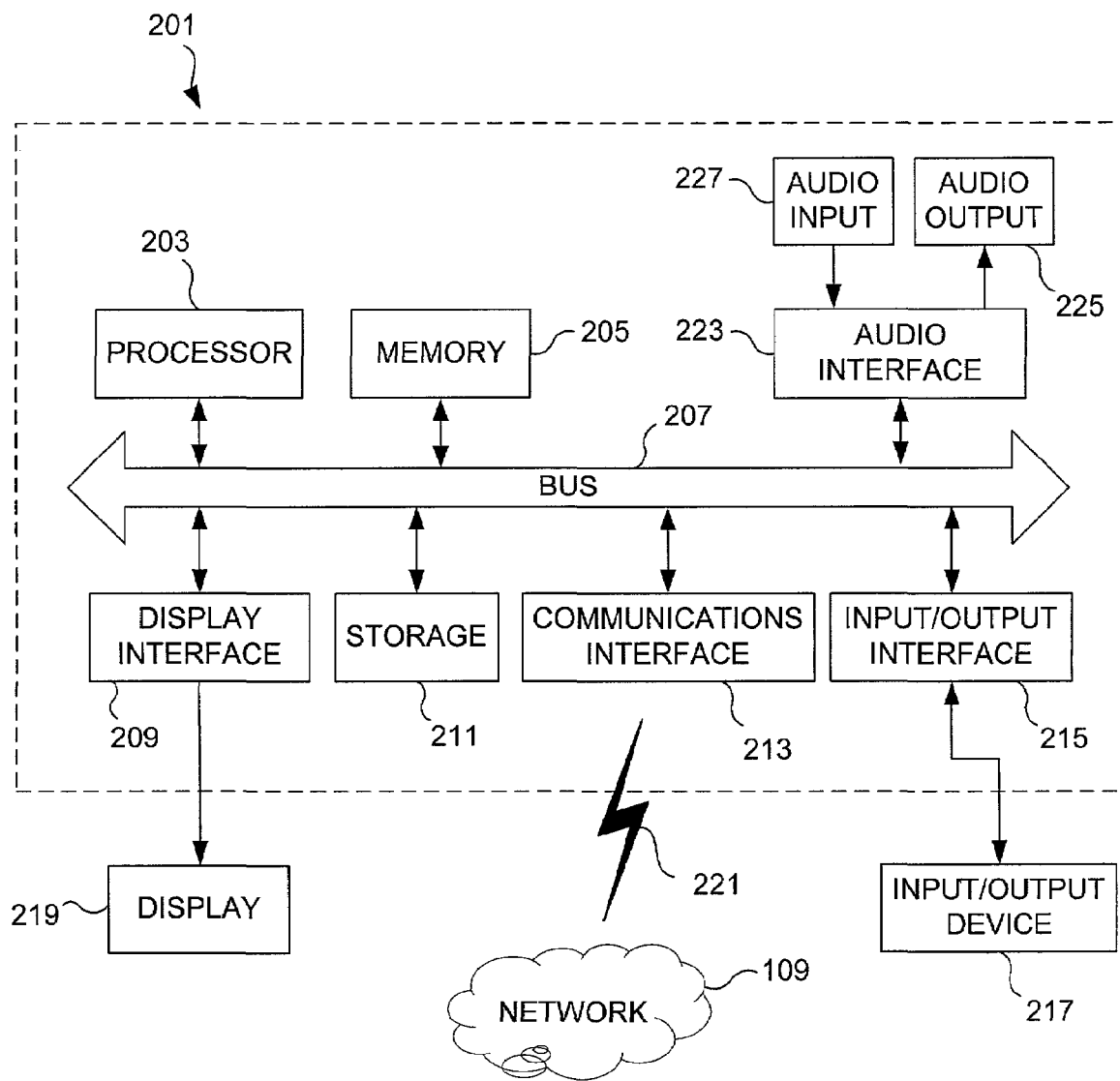
FIG. 2 is a block diagram illustration of an embodiment of a computer system representative of a server or a client system in accordance with the teachings of the present invention.

With reference now primarily to FIG. 2, a block diagram illustrating one embodiment of a machine 201, representative of the server 103 and/or the client systems 105 and 107, is shown in accordance with the teachings of the present invention. Typically, the server 103 may comprise a computer server or similar type of server hardware that is designed to communicate with a plurality of other machines. The clients 105 and 107 may comprise various types of machines, including a desktop computer or a workstation, for example, in an embodiment. In one embodiment, the machine 201 is a computer that includes a processor 203 coupled to a bus 207. A memory 205, a storage 211, a display interface 209, a communications interface 213, an input/output interface 215, and an audio interface 223 are also coupled to the bus 207, in the illustrated embodiment.

In one embodiment, the machine 201 interfaces to external systems through the communications interface 213. The communications interface 213 may include a radio transceiver compatible with various modulated signals, wireless telephone signals, or the like. The communications interface 213 may also include an Ethernet adapter, an analog modem, Integrated Services Digital Network ("ISDN") modem, cable modem, Digital Subscriber Line ("DSL") modem, a T-1 line interface, a T-3 line interface, an optical carrier interface (e.g., OC-3), token ring interface, satellite transmission interface, a wireless interface, or other interfaces for coupling a device to other devices.

In one embodiment, a carrier wave signal 221 is received/transmitted between the communications interface 213 and the network 109. The communications signal 221 may be used to interface the machine 201 with another computer system, a network hub, a router, or the like, in various embodiments. In one embodiment, the carrier wave signal 221 is considered to be machine-readable media, which may be transmitted through wires, cables, optical fibers, or through the atmosphere, or the like.

The processor 203 may be a suitable commercially available processor. The memory 205 may be a machine-readable medium such as dynamic random access memory ("DRAM"), and may include static random access memory ("SRAM"). The display interface 209 controls a display 219, which in one embodiment may be a cathode ray tube ("CRT"), a liquid crystal display ("LCD"), an active matrix display, or the like. An input/output device 217, coupled to the input/output interface 215 may be a keyboard, a disk drive, a printer, a scanner, or other input/output device, including a mouse, a trackball, a trackpad, a joystick, or the like. In one embodiment, the audio interface 223 controls an audio output 225, which may include for example, audio speakers, headphones, an audio receiver, an amplifier, or the like. The audio interface 223 also controls an audio input 227, which may include for example, a microphone, or input(s) from an audio or musical device, or the like, in an embodiment.

The storage 211, in one embodiment, may include machine-readable media such as for example, but not limited to, a magnetic hard disk, a floppy disk, an optical disk, a read-only memory component ("ROM"), a smart card, or another form of storage for data. In one embodiment, the storage 211 may include removable media, read-only memory, readable/writable memory, or the like. Some of the data may be written by a direct memory access process into the memory 205 during execution of software in the computer system 201. It will be appreciated that software may reside in the storage 211, the memory 205, or may be transmitted or received via a modem or a communications interface 213. For the purpose of the specification, the term "machine-readable medium" shall be taken to include any medium that is capable of storing data, information, or encoding a sequence of instructions or operations for execution by the processor 203 to cause the processor 203 to perform the methodologies of the present invention. The term "machine-readable medium" shall be understood to include, for example, solid-state memories; ROM; random access memory ("RAM"); magnetic disk storage media; optical storage media; flash memory devices; electrical, optical, acoustical or other form of propagated signals (e.g., carrier tones, infrared signals, and digital signals); and the like.

Figure 3:
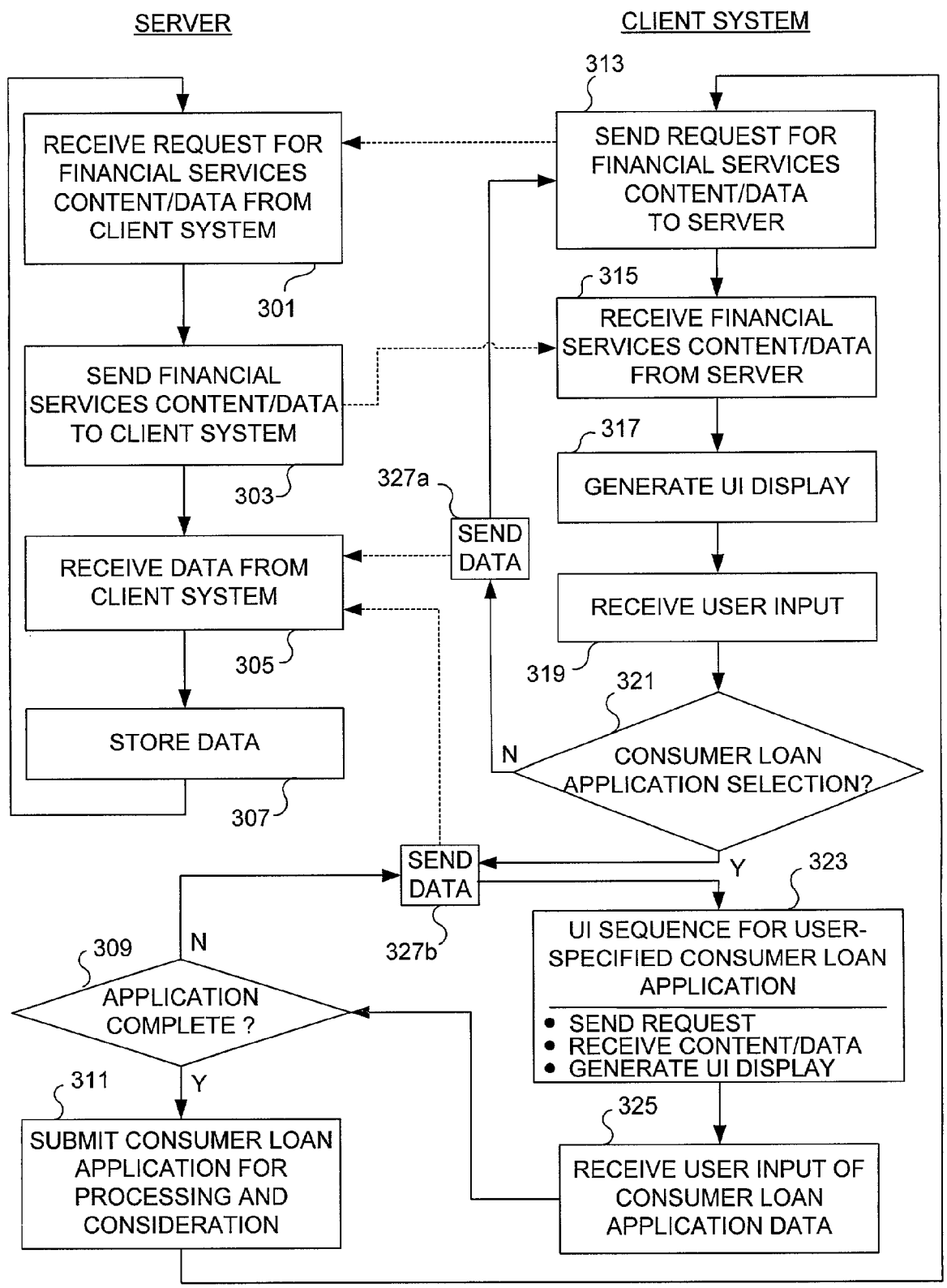
FIG. 3 is a flow diagram illustrating an embodiment of a flow of events in a server and in a client system in accordance with the teachings of the present invention.

With reference now primarily to FIG. 3, a flow diagram illustrating an embodiment of a flow of events in a server (e.g., the server 103, FIG. 1) and in a client system (e.g., the client systems 105 and/or 107, FIG. 1) is shown in accordance with the teachings of the present invention. As the following discussion proceeds with regard to FIG. 3, reference is made to FIGS. 4-32 to illustrate various aspects of the present invention. It will be appreciated that reference to "the client system 105, 107" is intended to refer to either or both of the client systems 105 and 107 illustrated in FIG. 1, as each may operate independently of the other. It will also be appreciated that in the following discussion, functionalities of the server 103 and/or the client systems 105 and 107 may be facilitated by the components illustrated in FIG. 2, as discussed above.

In one embodiment, a user, for example a loan officer or other financial institution administrator, may access a content site (e.g., a web site) maintained by the server 103 in order to input customer profile data and/or to prepare a consumer loan application at the request of the customer. Access to the content site may be facilitated via a unique address identifier such as a universal resource locator ("URL"), or the like, communicated via the network 109 (see, e.g., FIG. 1). In one embodiment, access to the content site may be facilitated by a commercially available browser application for example, stored and executed by the client system 105, 107. When the content site is accessed, the client system 105, 107 may send a request for financial services content and/or data to the server 103 (see, e.g., process block 313) via the communications interface 213 (see, e.g., FIG. 2). The server 103 may then receive the request for financial services content and/or data from the client system 105, 107 (see, e.g., process block 301), and send the financial services content and/or data to the client system 105, 107 (see, e.g., process block 303) via the communications interface 213. As discussed above, the communication of requests from the client system 105, 107 to the server 103, and the communication of content and/or data from the server 103 to the client system 105, 107, may be facilitated by any one of a number of suitable network communication protocols, in an embodiment.

The client system 105, 107 may then receive the financial services content and/or data from the server 103 (see, e.g., process block 315), and generate a UI display in response thereto (see, e.g., process block 317). In one embodiment, a UI display corresponding to a content page (e.g., an HTML page) maintained by the server as part of the content site, such as that illustrated in FIG. 10, may be generated (e.g., by a browser application) to enable the user to log-on to the financial services site by entering a user name and password, for example. The client system 105, 107 may receive the user input (e.g., the user name and password) (see, e.g., process block 319) via the input/output interface 215 (see, e.g., FIG. 2), and send a request for additional content and/or data to the server 103 in response to the user input, in an embodiment. If the received user input (see, e.g., block 319) does not correspond to a consumer loan application selection (see, e.g., process block 321), then any input data may be communicated to the server 103 (see, e.g., process block 327a), and process blocks 313, 301, 303, 315, and 317 may be repeated as indicated in FIG. 3.

It will be appreciated that the log-on view UI display illustrated in FIG. 10 may not be necessary in all embodiments of the present invention, but may be provided as a security feature to prevent unauthorized access to the content site, and to the data associated therewith, maintained by the server 103. It will also be noted that in the various UI displays depicted in FIGS. 10-32, links to other content pages and/or actions are associated with user-actuateable "buttons" illustrated with diagonal lines, such as the "OK" and "CANCEL" buttons 1001, 1003, respectively, shown in FIG. 10.

For example, the user may enter the user name and password (collectively "data") to gain access to the financial services content site, and actuate (e.g., via an input/output device 217, FIG. 2) the "OK" button 1001 to submit the data for processing (see, e.g., process block 305) by a software application being executed by the server 103. If the user name and password are accepted by the software application, then subsequent content and/or data may be communicated to the client system 105, 107 to cause generation of another UI display, for example a customer view UI display such as that illustrated in FIG. 11. In one embodiment, the subsequent UI display may be selected from a pull-down menu, such as the "CONNECT TO" menu 1005 illustrated in FIG. 10.

With continued reference to FIG. 3, and to the foregoing example, the loan officer may then input new customer profile data into various data fields 1102 of a customer form applet 1101, or may select to search for an existing customer's records via selection of a "QUERY" button 1103, for example. In one embodiment, the user (e.g., the loan officer) may also select another new customer record by selecting the "NEW" button 1105. If an existing customer's records are selected, pending consumer loan applications and accounts (e.g., checking account, savings account, certificate of deposit, and the like) may be displayed (see, e.g., reference numerals 1107 and 1109, respectively) in scrollable list applets, for example. The client system may then again receive the user input (see, e.g., block 319) of information and/or data via the various data fields 1102 of the customer form applet 1101, in an embodiment.

With continued reference to FIGS. 3 and 11, after having entered the customer profile data in the data fields 1102, the user may then select a consumer loan application button 1111, which may appear as an icon, for example, on a portion of the customer view UI display of FIG. 11. In one embodiment in accordance with the teachings of the present invention, selection of the consumer loan application button 1111 (see, e.g., process block 321) may cause the customer profile data to be communicated to the server 103 (see, e.g., process block 327*b*), where the data may be received (see, e.g., process block 305), and stored (see, e.g., process block 307) in a communicatively coupled storage device, such as a relational database (e.g., the database 111, FIG. 1). Selection of the consumer loan application button 1111 may also cause entry into a UI display sequence for a user-specified consumer loan application (see, e.g., process block 323). It will be appreciated that the consumer loan application button 1111, or its equivalent, may appear in any one of a number of different forms, or may be activated by any one of a number of different mechanisms, in order to launch a UI display or sequence of UI displays to facilitate the capture of consumer loan application data in accordance with the teachings of the present invention.

The capture of consumer loan application data corresponding to a variety of types of consumer loan applications may be facilitated by embodiments of the present invention. For example, consumer loan application data corresponding to an auto loan application, an auto lease application, a personal loan application, a home equity loan application, a credit card application, a small business loan application, or the like, may be captured via a software application, linking a sequence of UI displays, in accordance with the teachings of the present invention. Flow diagrams illustrating embodiments of sequences of UI displays for capturing consumer loan application data for loan applications, such as those described above, are illustrated in FIGS. 4-9. The corresponding UI displays themselves are illustrated in FIGS. 10-32.

Figures 12, 13:
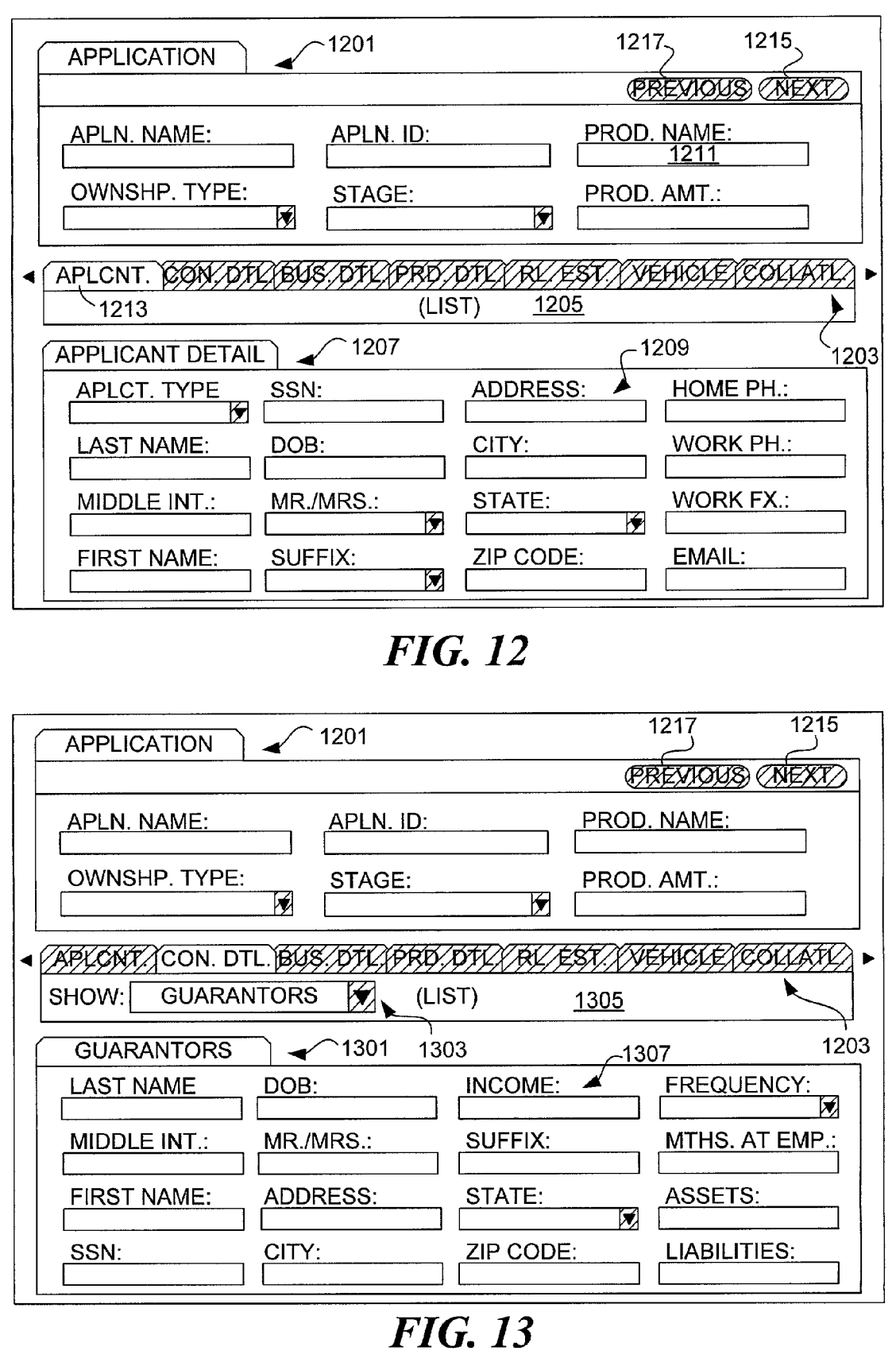

In one embodiment, a UI sequence for all consumer loan application types (see, e.g., block 323) begins with an applicant/applicant details view, as illustrated in FIG. 12. The applicant/applicant details view UI display of FIG. 12 may be automatically accessed upon actuation of the consumer loan application button 1111, in an embodiment, by sending a request to the server 103, and receiving content and/or data from the server 103 to cause generation of the UI display, as discussed above. The applicant/applicant details view UI display of FIG. 12 includes, in one embodiment, an application header applet 1201, a menu bar 1203, which may be displayed adjacent to a list applet 1205 including information relevant to the specific UI display, and an applicant detail form applet 1207 including a plurality of data fields 1209 configured to receive consumer loan application data.

The application header applet 1201 may, in an embodiment, include a plurality of data fields for the entry of information related to the type of consumer loan sought by the applicant. The product (e.g., the product name field 1211) selected may impact the type and/or kind of consumer loan application data required to complete the loan application. As a consequence, the automated sequence of UI displays corresponding to each of the different loan types (see, e.g., FIGS. 4-9) discussed above, may differ, in an embodiment, depending on which product is selected by the user. UI displays outside the scope of the automated sequence may be accessed via the menu bar 1203 by selecting the applicable tab (e.g., the applicant tab 1213), and choosing from any pull-down menu, for example, associated with a particular tab, in an embodiment. It will be noted that the menu bar 1203 may be scrollable (from right to left and vice versa), in an embodiment, and that tabs in addition to those illustrated in the depicted embodiments may also be included.

In one embodiment, the list applet 1205 may comprise a list of all applicants, including information corresponding to each of the data fields 1209 of the applicant details form applet 1207 for each applicant. The user may then scroll through the list of applicants to edit information corresponding to each, if necessary, in an embodiment. In one embodiment, the user may select an applicant from the list (e.g., by highlighting the name), and the information corresponding to the applicant will be displayed in the data fields 1209 of the applicant detail form applet 1207 to enable editing thereof.

The plurality of data fields 1209 of the applicant detail form applet 1207 may be pre-populated with data derived from the customer form applet 1101, in an embodiment. The reader will recall that the customer profile data entered in the data fields 1102 of the customer form applet 1101, as discussed above, was communicated to the server 103 (see, e.g., block 327*b*, FIG. 3) for receipt and storage (see, e.g., blocks 305 and 307, respectively) in a database to be accessible via customer name, or other unique identifier. If customer profile data corresponding to other applicants is also available, this information may be communicated from the server 103 to the client system 105, 107 for incorporation into the illustrated UI display as well.

When all of the requisite consumer loan application data has been received by the client system 105, 107 (see, e.g., process block 325, FIG. 3) via entry into, or editing in, the plurality of data fields 1209 of the applicant detail form applet 1207, the user may select a "NEXT" button 1215 to proceed with the next UI display in the sequence corresponding to the user-specified loan application type. A "PREVIOUS" button 1217, to enable the user to return to the previous UI display is also provided, in an embodiment. Actuation of the "NEXT" button 1215 initiates a determination regarding whether the consumer loan application is complete at this stage (see, e.g., process block 309). Since the loan application is not yet complete, the entered consumer loan application data is communicated to the server 103 (see, e.g., process block 327*b*), and the process enters an iterative loop beginning again at process block 323. Again, a request for the content and/or data corresponding to the next successive UI display in the sequence is sent to the server 103, and the content and/or data is received by the client system 105, 107 to cause generation of the next successive UI display (see, e.g., block 323).

With reference now primarily to FIGS. 4-9, embodiments of sequences of UI displays for capturing consumer loan application data corresponding to various user-specified consumer loan applications are illustrated in accordance with the teachings of the present invention. Depending on which type of consumer loan application is specified by the user (e.g., in the product name data field 1211, FIG. 12), a different sequence of UI displays will be accessed automatically (e.g., via actuation of the "NEXT" button 1215, FIG. 12) to capture all of the requisite consumer loan application data corresponding to the specified loan application type. As mentioned previously, views outside of this sequence may be accessed by selection of a tab from the menu bar 1203, in an embodiment. The reader will note that as the sequence of UI displays are automatically selected, the tab corresponding to the particular view shown in the UI display will be highlighted (as the applicant tab 1213 is highlighted in FIG. 12).

Figure 4:
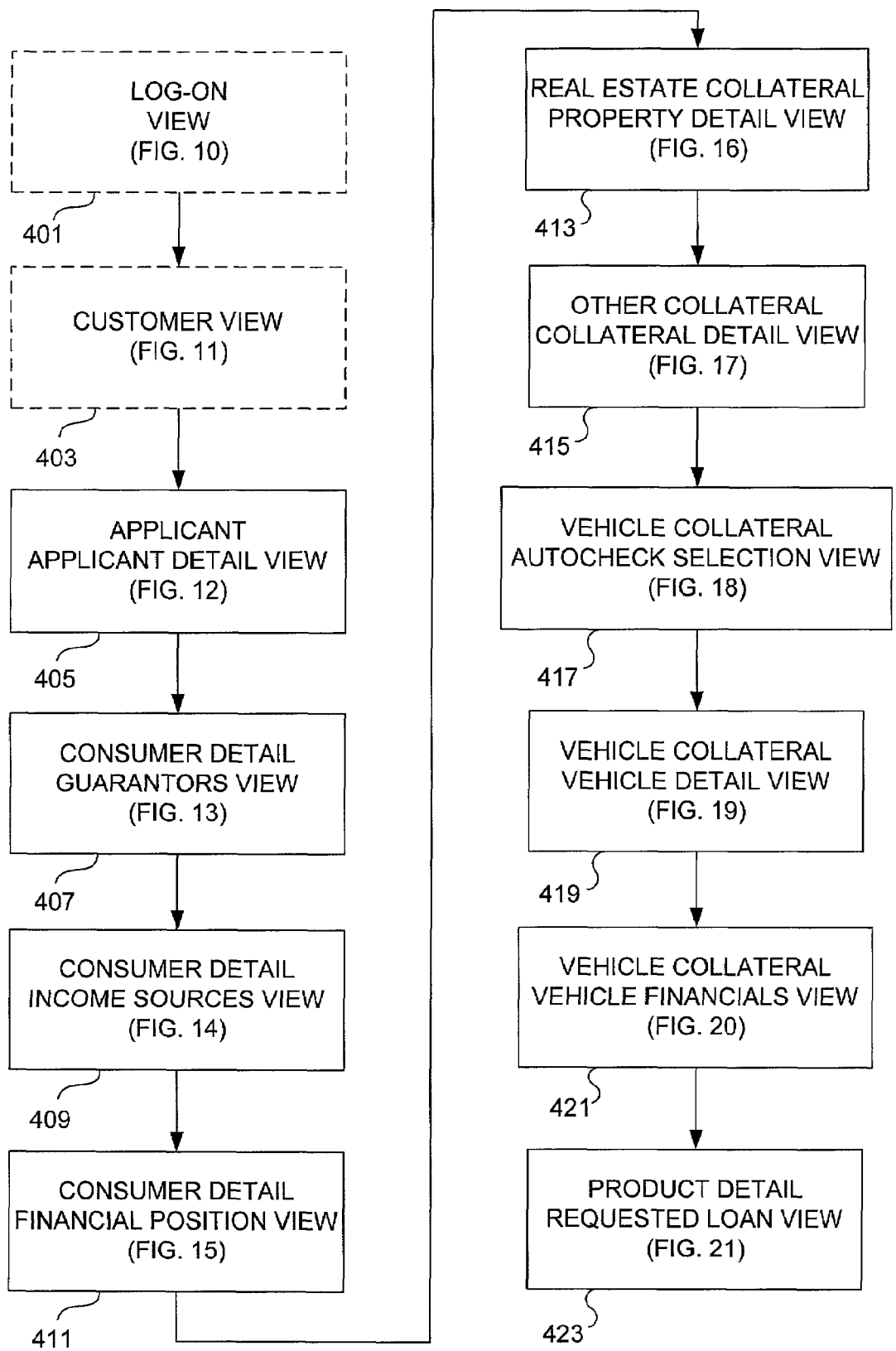
FIG. 4 is a flow diagram illustrating an embodiment of a sequence of user interface ("UI") displays for capturing auto loan application data in accordance with the teachings of the present invention.

FIG. 4 is a flow diagram illustrating an embodiment of a sequence of UI displays for capturing auto loan application data. In the illustrated embodiment, the flow begins with the log-on view (see reference numeral 401) and the customer view (see reference numeral 403) illustrated in FIGS. 10 and 11, respectively, as discussed above. Blocks corresponding to these two views (401 and 403) are illustrated with dashed lines (in FIGS. 4-9) to indicate that they fall outside of the UI sequence as described in conjunction with process block 323 of FIG. 3, but are included to illustrate their relationship with the UI sequence. Following the customer view 403, the flow proceeds to the applicant/applicant detail view (see reference numeral 405) illustrated in FIG. 12, and discussed above.

The sequence of UI displays for capturing auto loan application data next proceeds to a consumer detail/guarantors view (see reference numeral 407), such as that illustrated in FIG. 13. The consumer detail/guarantors view UI display of FIG. 13 may include the application header 1201, the "NEXT" button 1215, and the "PREVIOUS" button 1217, as discussed above, as well as the menu bar 1203 (although a different tab may be highlighted). The application header applet 1201 may be provided in the UI display to associate the collection of consumer loan application data with the current loan application. A list applet 1305, like that discussed above, but corresponding to data fields 1307 of a guarantors form applet 1301 may be displayed adjacent to the menu bar 1203, in an embodiment. In one embodiment, several different form applets (e.g., the guarantors form applet 1301) may be shown in conjunction with the consumer details ("CON. DTL.") tab of the menu bar 1203 by user selection of the desired form applet from a pull-down menu 1303.

In an embodiment of the automated UI sequence of the present invention, the appropriate form applet may be automatically selected. Collection of guarantor information ensures that the guarantor information is stored with the loan application, thereby streamlining the processing of the loan application. In a manner similar to that discussed above, previously entered guarantor information may pre-populate the data fields 1307 of the guarantor form applet 1301, in an embodiment, via a request to the server 103 to provide such information from the database 111.

The sequence of UI displays for capturing auto loan application data next proceeds to a consumer detail/income sources view (see reference numeral 409), such as that illustrated in FIG. 14. The consumer detail/income sources view UI display of FIG. 14 may include the application header 1201, the "NEXT" button 1215, and the "PREVIOUS" button 1217, as discussed above, as well as the menu bar 1203. A list applet 1405, like that discussed above, but corresponding to data fields 1403 of an income sources form applet 1401 may be displayed adjacent to the menu bar 1203, in an embodiment. It will be noted that the pull-down menu 1303 has been automatically adjusted to the income sources form applet selection in accordance with the teachings of the present invention.

The income sources form applet 1401 is generally configured to collect consumer loan application data corresponding to employment data and income-related information for each applicant entered previously (e.g., via the applicant/applicant detail view UI display, FIG. 11). In a manner similar to that described above, previously entered information corresponding to one or more of the plurality of data fields 1403 of the income sources form applet 1401 may be used to pre-populate those data fields. In one embodiment, if the customer has previously had a financial statement prepared by the financial institution preparing the consumer loan application, electronically stored information from the financial statement may be used to pre-populate the data fields 1403 of the income sources applet 1401.

The sequence of UI displays for capturing auto loan application data next proceeds to a consumer detail/financial position view (see reference numeral 411), such as that illustrated in FIG. 15. The consumer detail/financial position view UI display of FIG. 15 may include the application header 1201, the "NEXT" button 1215, and the "PREVIOUS" button 1217, as discussed above, as well as the menu bar 1203. A list applet 1505, like that discussed above, but corresponding to data fields 1503 of a financial position form applet 1501 may be displayed adjacent to the menu bar 1203, in an embodiment. Again, it will be noted that the pull-down menu 1303 has been automatically adjusted to the financial position form applet selection in accordance with the teachings of the present invention.

The financial position form applet 1501 is generally configured to capture consumer loan application data corresponding to assets, their estimated value and description, as well as liabilities each applicant has, such as monthly payments, and the like. Such things as real estate, vehicles, as well as other assets and liabilities may be recorded in the data fields 1503 of the financial position form applet 1501, in an embodiment. In a manner similar to that described above, previously entered information corresponding to assets and/or liabilities may pre-populate the data fields 1503 of the financial position form applet 1501. For example, a financial statement such as that described above in conjunction with FIG. 14 may include information for pre-populating the data fields 1503 of the financial position form applet 1501.

Figure 5:
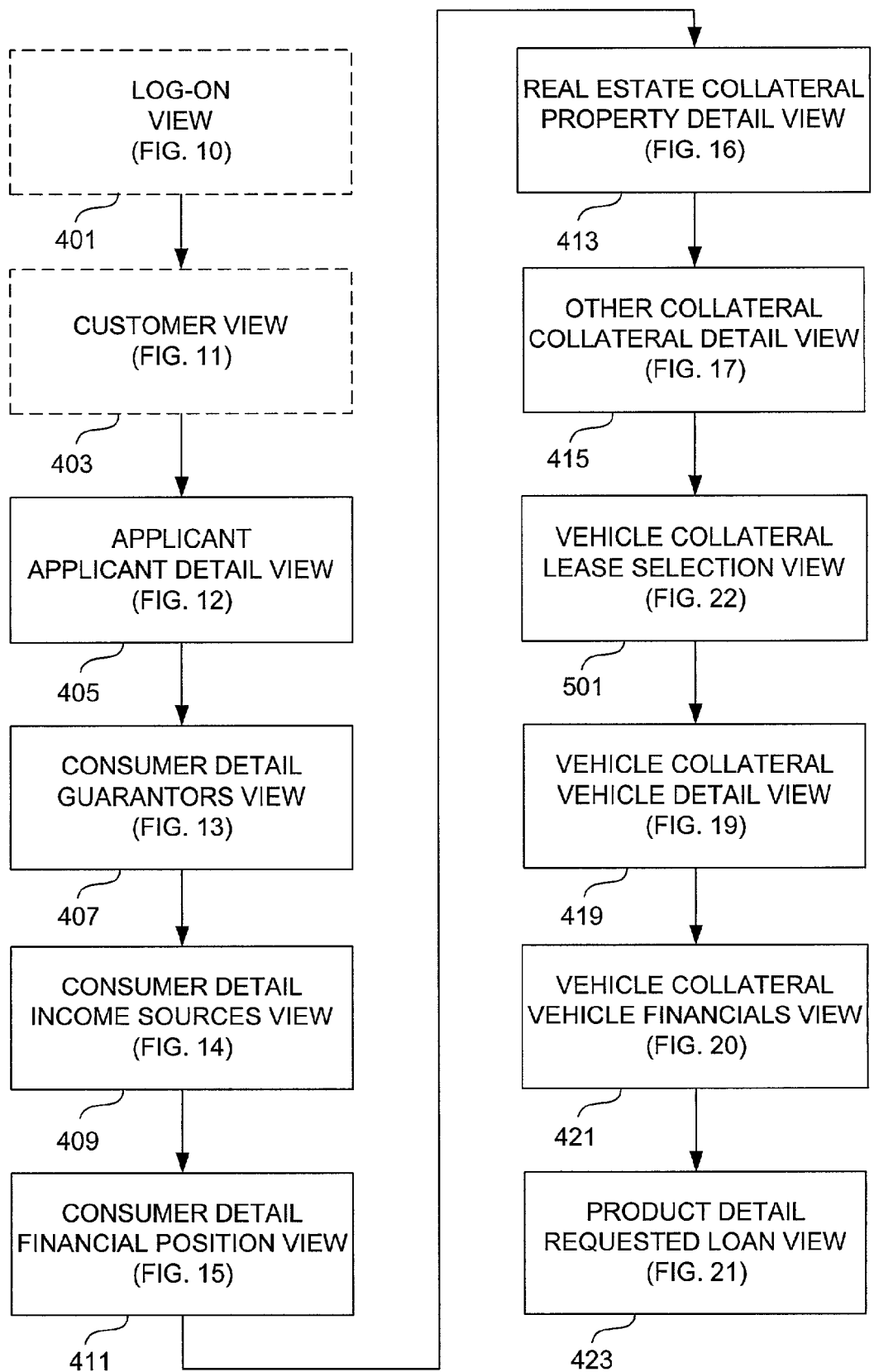
FIG. 5 is a flow diagram illustrating an embodiment of a sequence of UI displays for capturing auto lease application data in accordance with the teachings of the present invention.

Having captured information regarding consumer details related to each applicant, the sequence of UI displays for capturing auto loan application data next proceeds to capture real estate and other collateral information. For example, actuation of the "NEXT" button 1215 of FIG. 15 causes the generation of a real estate collateral/property detail view (see reference numeral 413), such as that illustrated in FIG. 16. The real estate collateral/property detail view UI display of FIG. 16 may include the application header 1201, the "NEXT" button 1215, and the "PREVIOUS" button 1217, as discussed above, as well as the menu bar 1203. A list applet 1605, like that discussed above, but corresponding to data fields 1603 of a property detail form applet 1601 may be displayed adjacent to the menu bar 1203, in an embodiment. A pull-down menu 1607 may be automatically adjusted to display the property detail form applet selection, in an embodiment. The property detail form applet 1601 may generally be configured to capture collateral information related to the real estate assets identified in the consumer financial position form applet 1501 (FIG. 5). As discussed above, the data fields 1603 of the property detail form applet 1601 may be pre-populated with previously entered information, in an embodiment.

The sequence of UI displays for capturing auto loan application data next proceeds to an other collateral/collateral detail view (see reference numeral 415), such as that illustrated in FIG. 17. The other collateral/collateral detail view UI display of FIG. 17 may include the application header 1201, the "NEXT" button 1215, and the "PREVIOUS" button 1217, as discussed above, as well as the menu bar 1203. A list applet 1705, like that discussed above, but corresponding to data fields 1703 of a collateral detail form applet 1701 may be displayed adjacent to the menu bar 1203, in an embodiment. A pull-down menu 1707 may be automatically adjusted to the collateral detail form applet selection in an embodiment. The collateral detail form applet 1701 may generally be configured to capture collateral information related to assets other than real estate, identified in the consumer financial position form applet 1501 (FIG. 5). As discussed above, the data fields 1703 of the collateral detail form applet 1701 may be pre-populated with previously entered information, in an embodiment.

The sequence of UI displays for capturing auto loan application data next proceeds to a vehicle collateral/autocheck selection view (see reference numeral 417), such as that illustrated in FIG. 18. The vehicle collateral/autocheck selection view UI display of FIG. 18 may include the application header 1201, the "NEXT" button 1215, and the "PREVIOUS" button 1217, as discussed above, as well as the menu bar 1203. A list applet 1805, like that discussed above, but corresponding to data fields 1803 of an autocheck selection form applet 1801 may be displayed adjacent to the menu bar 1203, in an embodiment. A pull-down menu 1807 may be automatically adjusted to the autocheck selection form applet selection in an embodiment. The autocheck selection form applet 1801 may generally be configured to capture consumer loan application data corresponding to pertinent vehicle descriptions, including selected options and associated valuations for the purchase or trade-in vehicle. As discussed above, the data fields 1803 of the autocheck selection form applet 1801 may be pre-populated with previously entered data, in an embodiment.

The sequence of UI displays for capturing auto loan application data next proceeds to a vehicle collateral/vehicle detail view (see reference numeral 419), such as that illustrated in FIG. 19. The vehicle collateral/vehicle detail view UI display of FIG. 19 may include the application header 1201, the "NEXT" button 1215, and the "PREVIOUS" button 1217, as discussed above, as well as the menu bar 1203. A list applet 1905, like that discussed above, but corresponding to data fields 1903 of a vehicle detail form applet 1901 may be displayed adjacent to the menu bar 1203, in an embodiment. The pull-down menu 1807 (FIG. 18) corresponding to the "VEHICLE" tab of the menu bar 1203 may be automatically adjusted to the vehicle detail form applet selection in an embodiment. The vehicle detail form applet may generally be configured to capture consumer loan application data corresponding to the purchase or trade-in automobile, and may be pre-populated with data entered in the autocheck selection form applet 1801 (FIG. 18), in an embodiment in a manner similar to that described above.

The sequence of UI displays for capturing auto loan application data next proceeds to a vehicle collateral/vehicle financials view (see reference numeral 421), such as that illustrated in FIG. 20. The vehicle collateral/vehicle financials view UI display of FIG. 20 may include the application header 1201, the "NEXT" button 1215, and the "PREVIOUS" button 1217, as discussed above, as well as the menu bar 1203. A list applet 2005, like that discussed above, but corresponding to data fields 2003 of a vehicle financials form applet 2001 may be displayed adjacent to the menu bar 1203, in an embodiment. The pull-down menu 1807 (FIG. 18) corresponding to the "VEHICLE" tab of the menu bar 1203 may be automatically adjusted to the vehicle financials form applet selection, in an embodiment. The vehicle financials form applet 2001 may generally be configured to capture consumer loan application data corresponding to the price, rebates, down payment, trade-in details, and the like, associated with the auto loan, and may be pre-populated with previously entered data, in an embodiment, in a manner similar to that described above.

After all of the foregoing information has been captured for the auto loan application, specifics regarding the requested loan may be defined more clearly based on the customer's preferences. As such, in one embodiment, the sequence of UI displays for capturing auto loan application data concludes with a product detail/requested loan view (see reference numeral 423), such as that illustrated in FIG. 21. As before, the product detail/requested loan view UI display of FIG. 21 may include the application header 1201, as well as the "PREVIOUS" button 1217 and the menu bar 1203. In place of the "next" button described above, a "SUBMIT" button 2109 allows the user to submit the completed application (see, e.g., process block 309, FIG. 3) for processing and consideration for approval (see, e.g., process block 311, FIG. 3). In one embodiment of the present invention, a "SUBMIT" button (e.g., the "SUBMIT" button 2109) may be provided on each UI display, such as those described above, in order to enable the user to submit the consumer loan application even after having returned to a previous UI display via the "PREVIOUS" button 1217.

Data fields 2103 of a requested loan form applet 2101 allow the user to enter specific information regarding the loan for which the customer wishes to apply. As described above, a pull-down menu 2107 associated with the product detail ("PRD. DTL.") tab of the menu bar 1203 may be automatically adjusted to the requested loan form applet selection, in an embodiment. When the completed application is submitted, it will be communicated to the server 103 for processing and storage, and may become a record (e.g. of the applications list applet 1107, FIG. 11) associated with the customer's name, in an embodiment. The status of the loan application approval process may be viewed by accessing this information, in an embodiment.

With reference now primarily to FIG. 5, a flow diagram illustrating an embodiment of a sequence of UI displays for capturing auto lease application data is shown in accordance with the teachings of the present invention. It will be noted that the sequence of UI displays corresponding to the capture of auto lease application data is identical to that described above for the capture of auto loan application data, with a single exception: A vehicle collateral/lease selection view (see reference numeral 501), such as that illustrated in FIG. 22. The vehicle collateral/lease selection view UI display of FIG. 22 replaces the vehicle selection/autocheck selection view UI display of FIG. 18, described above in conjunction with FIG. 4 and the capture of auto loan application data. Because these flow are identical, but for the single exception, only the vehicle collateral/lease selection view UI display of FIG. 22 will be described below in reference to FIG. 5.

The vehicle collateral/lease selection view UI display of FIG. 22 may include the application header 1201, the "NEXT" button 1215, and the "PREVIOUS" button 1217, as discussed above, as well as the menu bar 1203. A list applet 2205, like that discussed above, but corresponding to data fields 2203 of a lease selection form applet 2201 may be displayed adjacent to the menu bar 1203, in an embodiment. The pull-down menu 1807 (FIG. 18) corresponding to the "VEHICLE" tab of the menu bar 1203 may be automatically adjusted to the lease selection form applet selection, in an embodiment, upon actuation of the "NEXT" button 1215 in the other collateral/collateral detail view UI display of FIG. 17 (see reference numeral 415, FIG. 5). The lease selection form applet 2201 may generally be configured to capture consumer loan application data corresponding to specifics related to the vehicle for which the loan application is being completed, and may be pre-populated with previously entered data, in an embodiment, in a manner similar to that described above.

Figure 6:
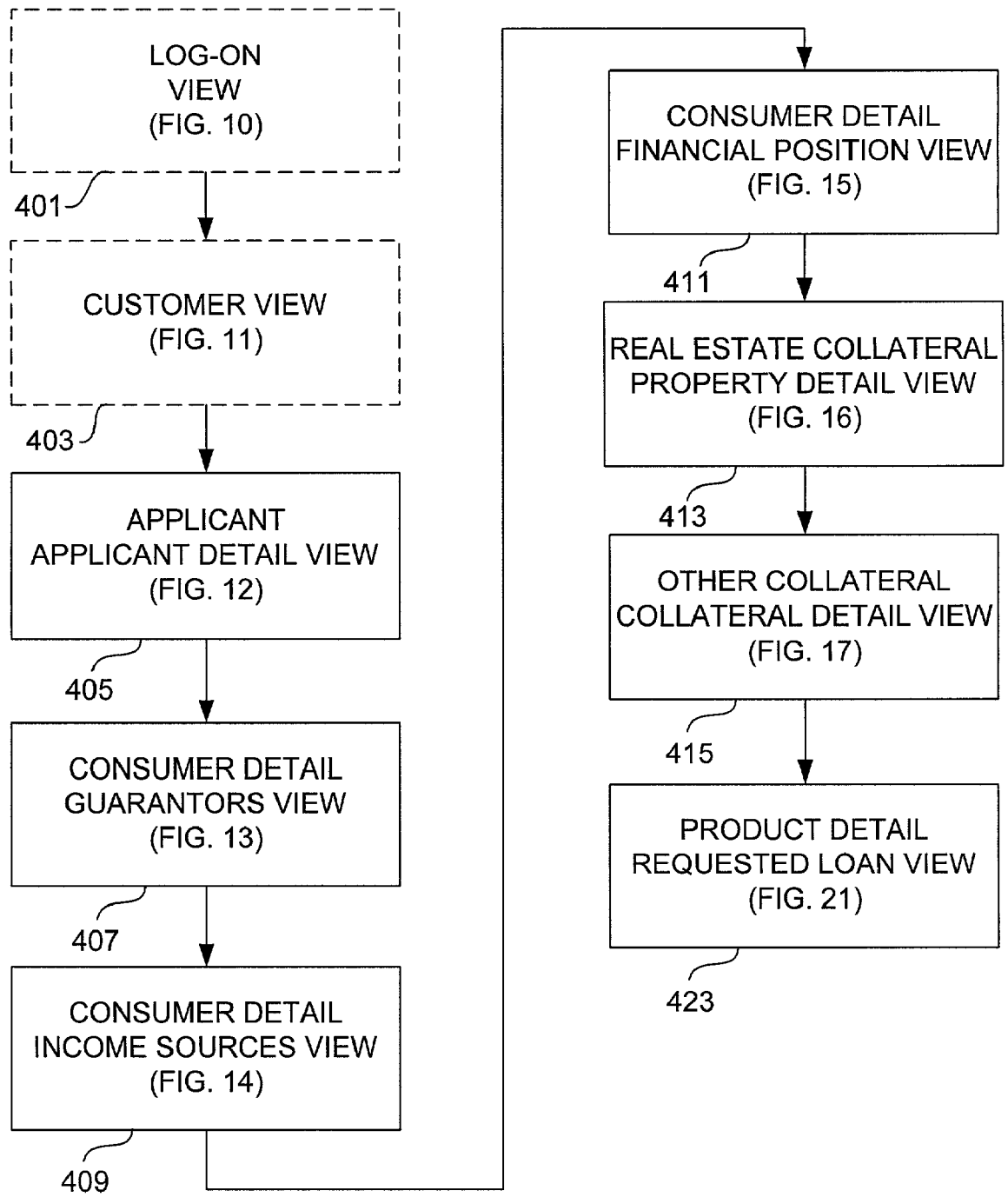
FIG. 6 is a flow diagram illustrating an embodiment of a sequence of UI displays for capturing personal loan application data in accordance with the teachings of the present invention.

With reference now primarily to FIG. 6, a flow diagram illustrating an embodiment of a sequence of UI displays for capturing personal loan application data is shown in accordance with the teachings of the present invention. In the illustrated embodiment, the sequence includes the log-on view (see reference numeral 401), the customer view (see reference numeral 403), the applicant/applicant detail view (see reference numeral 405), the consumer detail/guarantors view (see reference numeral 407), the consumer detail/income sources view (see reference numeral 409), and the consumer detail/financial position view (see reference numeral 411), as described above in conjunction with FIG. 4. In addition, the UI sequence illustrated in FIG. 6 also includes the real estate collateral/property detail view (see reference numeral 413), the other collateral/collateral detail view (see reference numeral 415), and the product detail/requested loan view (see reference numeral 417), also as described above in conjunction with FIG. 4.

Figure 7:
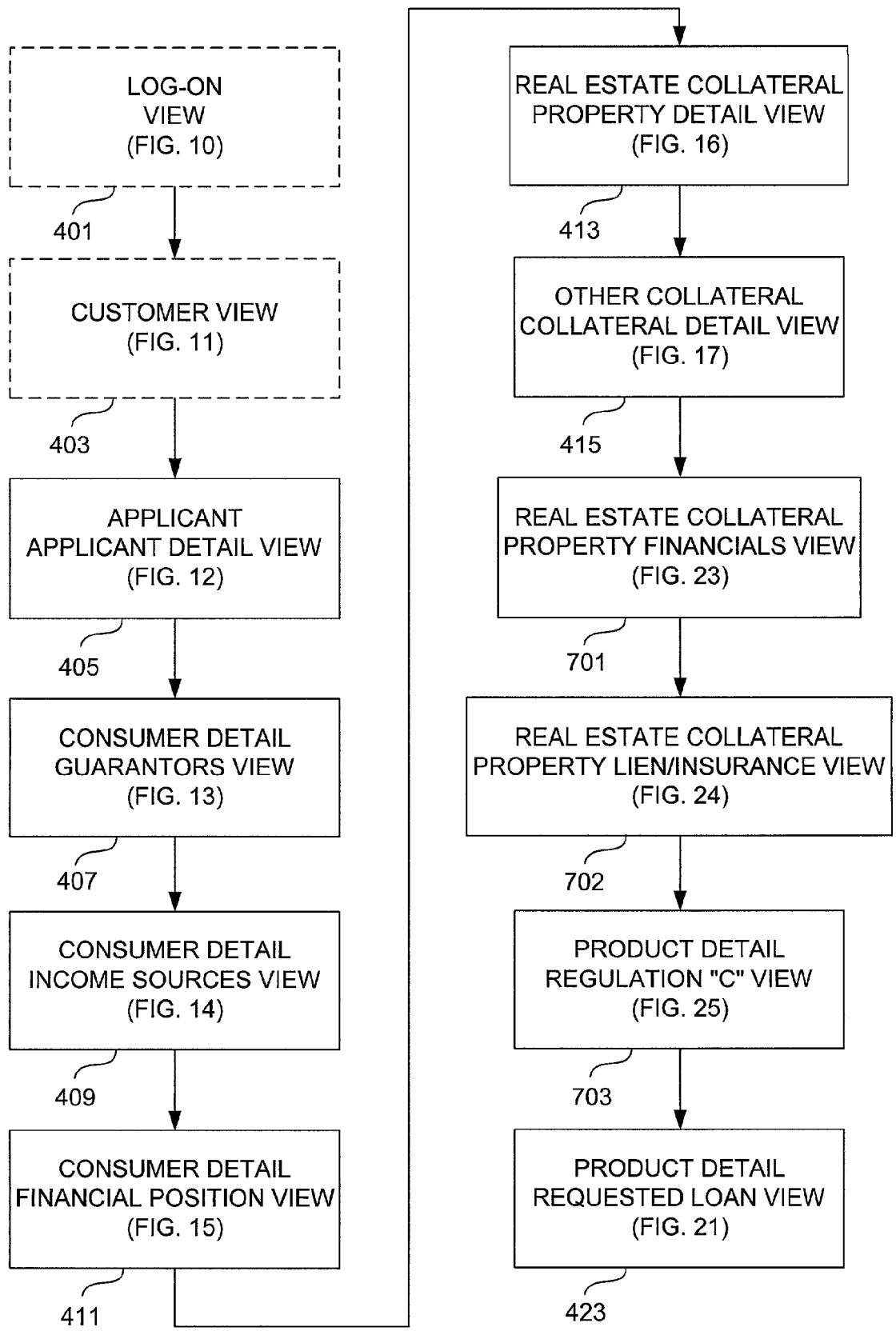
FIG. 7 is a flow diagram illustrating an embodiment of a sequence of UI displays for capturing home equity loan application data in accordance with the teachings of the present invention.

With reference now primarily to FIG. 7, a flow diagram illustrating an embodiment of a sequence of UI displays for capturing home equity loan application data is shown in accordance with the teachings of the present invention. The UI sequence begins with many of the views (see reference numerals 401-415, FIG. 7) described above in conjunction with FIG. 4. The UI sequence detailed in FIG. 7 then provides UI displays for the capture of information specific to a home equity loan application, as described below.

From the other collateral/collateral detail view (see reference numeral 415), the sequence of UI displays for capturing home equity loan application data proceeds to a real estate collateral/property financials view (see reference numeral 701), such as that illustrated in FIG. 23. The real estate collateral/property financials view UI display of FIG. 23 may include the application header 1201, the "NEXT" button 1215, and the "PREVIOUS" button 1217, as discussed above, as well as the menu bar 1203. A list applet 2305, like that discussed above, but corresponding to data fields 2303 of a property financials form applet 2301 may be displayed adjacent to the menu bar 1203, in an embodiment. The pull-down menu 1607 (FIG. 16) corresponding to the real estate ("RL. EST.") tab of the menu bar 1203 may be automatically adjusted to the property financials form applet selection in an embodiment. The property financials form applet 2301 may generally be configured to capture home equity loan application data corresponding to real estate figures specific to a collateral item, including appraisal value, estimated current value, original cost, mortgage balance, and the like.

The sequence of U displays for capturing home equity loan application data next proceeds to a real estate collateral/property lien and insurance view (see reference numeral 702), such as that illustrated in FIG. 24. The real estate collateral/property lien and insurance view UI display of FIG. 24 may include the application header 1201, the "NEXT" button 1215, and the "PREVIOUS" button 1217, as discussed above, as well as the menu bar 1203. A list applet 2405, like that discussed above, but corresponding to data fields 2403 of a lien and insurance form applet 2401 may be displayed adjacent to the menu bar 1203, in an embodiment. The pull-down menu 1607 (FIG. 16) corresponding to the real estate ("RL. EST.") tab of the menu bar 1203 may be automatically adjusted to the lien and insurance form applet selection, in an embodiment. The lien and insurance form applet 2401 may generally be configured to capture consumer loan application data corresponding to liens on the property, titles, and insurance coverage for the property, and may be pre-populated with previously entered data, in an embodiment, in a manner similar to that described above.

The sequence of UI displays for capturing home equity loan application data next proceeds to a product detail/regulation "C" view (see reference numeral 703), such as that illustrated in FIG. 25. The property detail/regulation "C" view UI display of FIG. 25 may include the application header 1201, the "NEXT" button 1215, and the "PREVIOUS" button 1217, as discussed above, as well as the menu bar 1203. A list applet 2505, like that discussed above, but corresponding to data fields 2503 of a regulation "C" form applet 2501 may be displayed adjacent to the menu bar 1203, in an embodiment. The pull-down menu 2107 (FIG. 21) corresponding to the product detail ("PRD. DTL.") tab of the menu bar 1203 may be automatically adjusted to the regulation "C" form applet selection, in an embodiment. The regulation "C" form applet 2501 may generally be configured to capture consumer loan application data corresponding to application-related information regarding the home mortgage disclosure act ("HMDA"), and may be pre-populated with previously entered data, in an embodiment, in a manner similar to that described above.

Following entry of the consumer loan application data specific to the home equity loan application, as described above, the UI sequence concludes with the product detail/requested loan view UI display (see reference numeral 423) as illustrated in FIG. 21, and described above in conjunction with FIG. 4.

Figure 8:
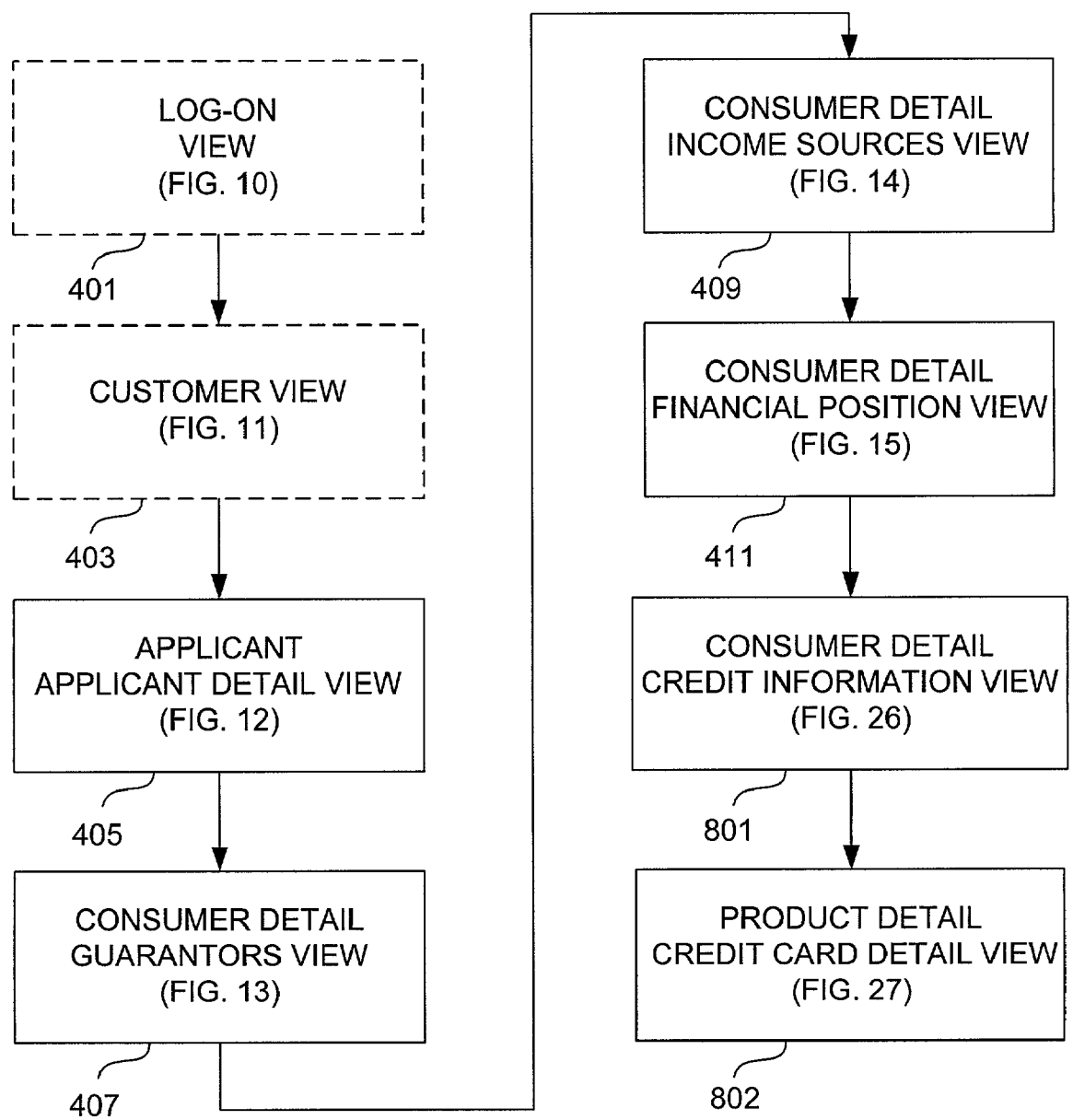
FIG. 8 is a flow diagram illustrating an embodiment of a sequence of UI displays for capturing credit card application data in accordance with the teachings of the present invention.

With reference now primarily to FIG. 8, a flow diagram illustrating an embodiment of a sequence of UI displays for capturing credit card application data is shown in accordance with the teachings of the present invention. The UI sequence begins with many of the views (see reference numerals 401-411, FIG. 8) described above in conjunction with FIG. 4. The UI sequence detailed in FIG. 8 then provides UI displays for the capture of information specific to a credit card application, as described below.

From the other consumer detail/financial position view (see reference numeral 411), the sequence of UI displays for credit card application data proceeds to a consumer detail/credit information view (see reference numeral 801), such as that illustrated in FIG. 26. The consumer detail/credit information view UI display of FIG. 26 may include the application header 1201, the "NEXT" button 1215, and the "PREVIOUS" button 1217, as discussed above, as well as the menu bar 1203. A list applet 2605, like that discussed above, but corresponding to data fields 2603 of a credit information form applet 2601 may be displayed adjacent to the menu bar 1203, in an embodiment. The pull-down menu 1303 (FIG. 13) corresponding to the consumer detail ("CON. DTL.") tab of the menu bar 1203 may be automatically adjusted to the credit information form applet selection in an embodiment. The credit information form applet 2601 may generally be configured to capture credit card application data corresponding to income, education, monthly payments, and the like, and may be pre-populated with previously entered information, such as from a financial statement, in an embodiment, as discussed above.

The sequence of UI displays for capturing credit card application data concludes with a product detail/credit card detail view (see reference numeral 802), such as that illustrated in FIG. 27. The product detail/credit card detail view UI display of FIG. 27 may include the application header 1201, the "SUBMIT" button 1209, and the "PREVIOUS" button 1217, as discussed above, as well as the menu bar 1203. A list applet 2705, like that discussed above, but corresponding to data fields 2703 of a credit card detail form applet 2701 may be displayed adjacent to the menu bar 1203, in an embodiment. The pull-down menu 2107 (FIG. 21) corresponding to the product detail ("PRD. DTL.") tab of the menu bar 1203 may be automatically adjusted to the credit card detail form applet selection, in an embodiment. The credit card detail form applet 2701 may generally be configured to capture consumer loan application data corresponding to demographic data, approval amounts, number of cards, and the like, and may be pre-populated with previously entered data, in an embodiment, in a manner similar to that described above.

Figure 9:
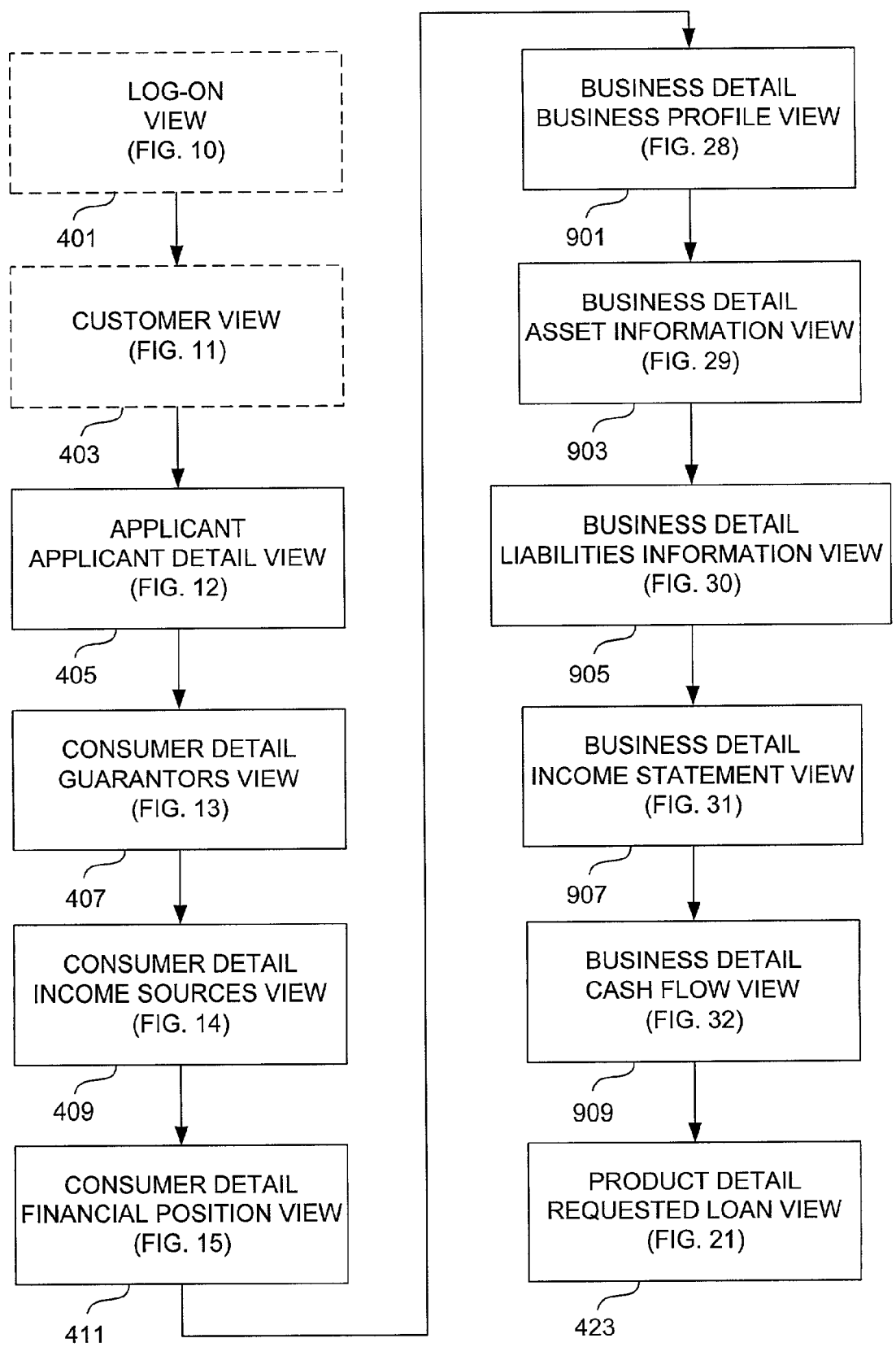
FIG. 9 is a flow diagram illustrating an embodiment of a sequence of U displays for capturing small business loan application data in accordance with the teachings of the present invention.

With reference now primarily to FIG. 9, a flow diagram illustrating an embodiment of a sequence of UI displays for capturing small business loan application data is shown in accordance with the teachings of the present invention. The UI sequence begins with many of the views (see reference numerals 401-411, FIG. 9) described above in conjunction with FIG. 4. The UI sequence detailed in FIG. 9 then provides UI displays for the capture of information specific to a small business loan application, as described below.

Figures 28, 29:
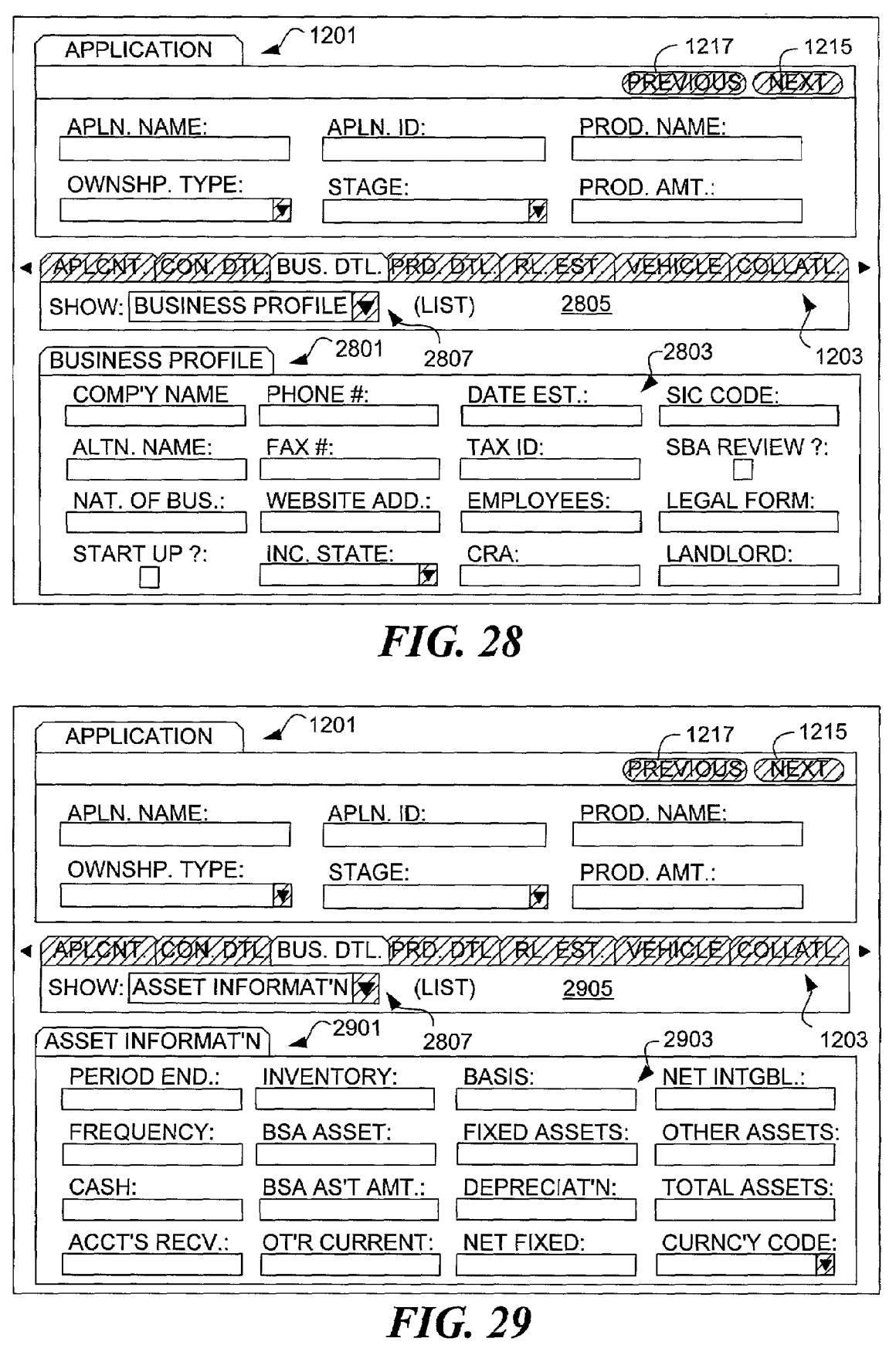

From the other consumer detail/financial position view (see reference numeral 411), the sequence of UI displays for small business loan application data proceeds to a business detail/business profile view (see reference numeral 901), such as that illustrated in FIG. 28. The business detail/business profile view UI display of FIG. 28 may include the application header 1201, the "NEXT" button 1215, and the "PREVIOUS" button 1217, as discussed above, as well as the menu bar 1203. A list applet 2805, like that discussed above, but corresponding to data fields 2803 of a business profile form applet 2801 may be displayed adjacent to the menu bar 1203, in an embodiment. A pull-down menu 2807 corresponding to the business detail ("BUS. DTL.") tab of the menu bar 1203 may be automatically adjusted to the business profile form applet selection in an embodiment. The business profile form applet 2801 may generally be configured to capture small business loan application data corresponding to basic information about the business such as the nature of the business, number of employees, state of incorporation, establishment data, and the like, and may be pre-populated with previously entered information, in an embodiment, as discussed above.

The sequence of UI displays for small business loan application data next proceeds to a business detail/asset information view (see reference numeral 903), such as that illustrated in FIG. 29. The business detail/asset information view UI display of FIG. 29 may include the application header 1201, the "NEXT" button 1215, and the "PREVIOUS" button 1217, as discussed above, as well as the menu bar 1203. A list applet 2905, like that discussed above, but corresponding to data fields 2903 of a asset information form applet 2901 may be displayed adjacent to the menu bar 1203, in an embodiment. The pull-down menu 2807 corresponding to the business detail ("BUS. DTL.") tab of the menu bar 1203 may be automatically adjusted to the asset information form applet selection, in an embodiment. The asset information form applet 2901 may generally be configured to capture small business loan application data corresponding to the financial state of the business for which the loan application is being completed, and the like, and may be tied to a financial statement, as discussed above to enable pre-population of the data fields 2903 with previously entered information, in an embodiment.

The sequence of UI displays for small business loan application data next proceeds to a business detail/liabilities information view (see reference numeral 905), such as that illustrated in FIG. 30. The business detail/abilities information view UI display of FIG. 30 may include the application header 1201, the "NEXT" button 1215, and the "PREVIOUS" button 1217, as discussed above, as well as the menu bar 1203. A list applet 3005, like that discussed above, but corresponding to data fields 3003 of a liabilities information form applet 3001 may be displayed adjacent to the menu bar 1203, in an embodiment. The pull-down menu 2807 corresponding to the business detail ("BUS. DTL.") tab of the menu bar 1203 may be automatically adjusted to the liabilities information form applet selection in an embodiment. The liabilities information form applet 3001 may generally be configured to capture small business loan application data corresponding to financial details of the business such as long-term debt, capital stock, total current liabilities, retained earnings, and the like, and may be pre-populated with previously entered information, in an embodiment, as discussed above. Information captured in the liabilities information form applet 3001 may be an important factor in determining the amount that may be loaned to the business.

The sequence of UI displays for small business loan application data next proceeds to a business detail/income statement view (see reference numeral 907), such as that illustrated in FIG. 31. The business detail/income statement view UI display of FIG. 31 may include the application header 1201, the "NEXT" button 1215, and the "PREVIOUS" button 1217, as discussed above, as well as the menu bar 1203. A list applet 3105, like that discussed above, but corresponding to data fields 3103 of a income statement form applet 3101 may be displayed adjacent to the menu bar 1203, in an embodiment. The pull-down menu 2807 corresponding to the business detail ("BUS. DTL.") tab of the menu bar 1203 may be automatically adjusted to the income statement form applet selection in an embodiment. The income statement form applet 3101 may generally be configured to capture small business loan application data corresponding to the business' net sales, the cost of goods sold, other income, expenses, taxes, and the like, and may be pre-populated with previously entered information, in an embodiment, as discussed above.

The sequence of UI displays for small business loan application data next proceeds to a business detail/cash flow view (see reference numeral 909), such as that illustrated in FIG. 32. The business detail/cash flow view UI display of FIG. 32 may include the application header 1201, the "NEXT" button 1215, and the "PREVIOUS" button 1217, as discussed above, as well as the menu bar 1203. A list applet 3205, like that discussed above, but corresponding to data fields 3203 of a cash flow form applet 3201 may be displayed adjacent to the menu bar 1203, in an embodiment. The pull-down menu 2807 corresponding to the business detail ("BUS. DTL.") tab of the menu bar 1203 may be automatically adjusted to the cash flow form applet selection in an embodiment. The cash flow form applet 3201 may generally be configured to capture small business loan application data corresponding to summaries of assets, liabilities, income, and the like, associated with the business, and may be pre-populated with previously entered information, in an embodiment, as discussed above.

Following entry of the consumer loan application data specific to the small business loan application, as described above, the UI sequence concludes with the product detail/requested loan view UI display (see reference numeral 423) as illustrated in FIG. 21, and described above in conjunction with FIG. 4. The completed loan is then submitted for processing and consideration for approval, as discussed above, and an additional loan application may be undertaken.

It will be appreciated that in various other embodiments in accordance with the teachings of the present invention, the views and applets described above may be combined in any one of a number of different ways to generate UI displays or sequences of UI displays to capture all requisite information pertaining to a particular consumer loan application.

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A method, comprising:
communicating a user interface from a server system to a client system via a network communication link, wherein
the user interface includes a plurality of user interface displays configured to capture consumer loan application data corresponding to a plurality of consumer loan applications,
the plurality of user interface displays are configured to receive a user input from a user of the consumer loan application data in at least one data field associated with one of the plurality of consumer loan applications selected by the user, and
the user interface is configured to present a sequence of user interface displays associated with the selected consumer loan application wherein the sequence of user interface displays is a subset of the plurality of user interface displays;
receiving the consumer loan application data at the sewer system from the client system via the network communication link;
storing the consumer loan application data in a storage device, wherein said storing is performed by the server system; and
communicating, by the server system, at least a portion of the consumer loan application data to the client system, wherein
the client system receives from the server system the at least a portion of the consumer loan application data, and
the client system uses the at least a portion of the consumer loan application data to pre-populate at least one data field corresponding to a subsequent user interface display of the sequence of user interface displays for display to the user, wherein
the client system subsequently generates the subsequent user interface display to include the at least the portion of the consumer loan application data communicated by the server system.

2. The method of claim 1 further comprising:
selecting each of the plurality of consumer loan applications from a group including an auto loan application, an auto lease application, a personal loan application, a home equity loan application, a credit card application, and a small business loan application.

3. The method of claim 1, wherein the subsequent one of the plurality of user interface displays comprises a user interface display corresponding to a sequence of user interface displays associated with the one of the plurality of consumer loan applications specified by the user.

4. The method of claim 1, wherein the subsequent one of the plurality of user interface displays comprises a user interface display corresponding to a sequence of user interface displays associated with a consumer loan application other than the one of the plurality of consumer loan applications specified by the user.

5. The method of claim 1, wherein
the plurality of user interface displays comprise hypertext markup language (HTML) documents, and
said communicating the user interface from the server system to the client system comprises transmitting the HTML documents via a network communication protocol in response to a request from the client system.

6. The method of claim 1, wherein storing the consumer loan application data in the storage device comprises:
storing the data in a manner to be retrieved by the server system in response to customer identifying information.

7. The method of claim 1, wherein the plurality of user interface displays comprises:
a sequence of user interface displays configured to capture consumer loan application data corresponding to the one of the plurality of consumer loan applications specified by the user, wherein
the sequence of user interface displays being accessible to the user in series via actuation of a button associated with each display of the sequence of user interface displays.

8. A machine-readable medium that includes a set of instructions, the set of instructions, which when executed, perform a method, comprising:
communicating a user interface from a server system to a client system via a network communication link, wherein
the user interface including a plurality of user interface displays configured to capture consumer loan application data corresponding to a plurality of consumer loan applications,
the plurality of user interface displays configured to receive a user input from a user of the consumer loan application data in at least one data field associated with one of the plurality of consumer loan applications selected by the user, and
the user interface is configured to present a sequence of user interface displays associated with the selected consumer loan application wherein the sequence of user interface displays is a subset of the plurality of user interface displays;
receiving the consumer loan application data at the server system from the client system via the network communication link;
storing the consumer loan application data in a storage device, wherein said storing is performed by the server system; and
communicating, by the server system, at least a portion of the consumer loan application data input to the client system, wherein the client system receives from the server system the at least a portion of the consumer loan application data input, and the client system uses the at least a portion of the consumer loan application data to pre-populate at least one data field corresponding to a subsequent user interface display of the sequence of user interface displays for display to the user, wherein the client system subsequently generates the subsequent user interface display to include the at least the portion of the consumer loan application data communicated by the server system.

9. The machine-readable medium of claim 8 further comprising instructions, which when executed, perform a method further comprising:

selecting each of the plurality of consumer loan applications from a group including an auto loan application, an auto lease application, a personal loan application, a home equity loan application, a credit card application, and a small business loan application.

10. The machine-readable medium of claim 8, wherein the subsequent one of the plurality of user interface displays comprises a user interface display corresponding to a sequence of user interface displays associated with the one of the plurality of consumer loan applications specified by the user.

11. The machine-readable medium of claim 8, wherein the subsequent one of the plurality of user interface displays comprises a user interface display corresponding to a sequence of user interface displays associated with a consumer loan application other than the one of the plurality of consumer loan applications specified by the user.

12. The machine-readable medium of claim 8, wherein the plurality of user interface displays comprise hypertext markup language (HTML) documents, and said communicating the user interface from the server system to the client system comprises transmitting the HTML documents via a network communication protocol in response to a request from the client system.

13. The machine-readable medium of claim 8, wherein storing the consumer loan application data in the storage device comprises:

storing the data in a manner to be retrieved by the server system in response to customer identifying information.

14. The machine-readable medium of claim 8, wherein the plurality of user interface displays comprises:

a sequence of user interface displays configured to capture consumer loan application data corresponding to the one of the plurality of consumer loan applications specified by the user, wherein the sequence of user interface displays being accessible to the user in series via actuation of a button associated with each display of the sequence of user interface displays.

15. A method, comprising:

receiving a user interface from a server system via a network communication link, the user interface including a plurality of user interface displays configured to capture consumer loan application data corresponding to a plurality of consumer loan applications;

receiving a user input from a user, the user input comprising entry of the consumer loan application data into at least one data field associated with one of the plurality of consumer loan applications specified by the user;

displaying a sequence of user interface displays associated with the specified consumer loan application wherein the sequence of user interface displays is a subset of the plurality of user interface displays;

communicating, by the client system to the server system, the consumer loan application data to the server system to store in a storage device;

receiving, by the client system, at least a portion of the consumer loan application data input by the user from the server systems;

pre-populating, by the client system, at least one data field of a subsequent user interface display of the sequence of user interface displays with the at least a portion of the consumer loan application data received from the server;

generating the subsequent user interface display to include the at least the portion of the consumer loan application data received from the server system; and displaying the subsequent user interface display to the user.

16. The method of claim 15 further comprising:

selecting each of the plurality of consumer loan applications from a group consisting of an auto loan application, an auto lease application, a personal loan application, a home equity loan application, a credit card application, and a small business loan application.

17. The method of claim 15, wherein the subsequent one of the plurality of user interface displays comprises a user interface display corresponding to a sequence of user interface displays associated with the one of the plurality of consumer loan applications specified by the user.

18. The method of claim 15, wherein the subsequent one of the plurality of user interface displays comprises a user interface display corresponding to a sequence of user interface displays associated with a consumer loan application other than the one of the plurality of consumer loan applications specified by the user.

19. The method of claim 15, wherein a portion of the plurality of user interface displays comprise a sequence of user interface displays configured to capture consumer loan application data corresponding to the one of the plurality of consumer loan applications specified by the user.

20. A machine-readable medium that includes a set of instructions, the set of instructions, which when executed, perform a method, comprising:

receiving a user interface from a server system via a network communication link, the user interface including a plurality of user interface displays configured to capture consumer loan application data corresponding to a plurality of consumer loan applications;

receiving a user input from a user, the user input comprising entry of the consumer loan application data into at least one data field associated with one of the plurality of consumer loan applications specified by the user;

displaying a sequence of user interface displays associated with the specified consumer loan application wherein the sequence of user interface displays is a subset of the plurality of user interface displays;

communicating, by the client system to the server system, the consumer loan application data to the server system to store in a storage device;

receiving, by the client system from the server system, at least a portion of the consumer loan application data input by the user from the server system;

pre-populating, by the client system, at least one data field of a subsequent user interface display of the sequence of user interface displays with the at least a portion of the consumer loan application data received from the server;

generating the subsequent user interface display to include the at least the portion of the consumer loan application data received from the server system; and displaying the subsequent user interface display to the user.

21. The machine-readable medium of claim 20 further comprising instructions, which when executed, perform a method further comprising:

selecting each of the plurality of consumer loan applications from a group consisting of an auto loan application, an auto lease application, a personal loan application, a home equity loan application, a credit card application, and a small business loan application.

22. The machine-readable medium of claim 20, wherein the subsequent one of the plurality of user interface displays comprises a user interface display corresponding to a sequence of user interface displays associated with the one of the plurality of consumer loan applications specified by the user.

23. The machine-readable medium of claim 20, wherein the subsequent one of the plurality of user interface displays comprises a user interface display corresponding to a sequence of user interface displays associated with a consumer loan application other than the one of the plurality of consumer loan applications specified by the user.

24. The machine-readable medium of claim 20, wherein a portion of the plurality of user interface displays comprise a sequence of user interface displays configured to capture consumer loan application data corresponding to the one of the plurality of consumer loan applications specified by the user.

* * * * *